United States Patent [19]

Brash

[11] Patent Number: 5,960,384
[45] Date of Patent: Sep. 28, 1999

[54] METHOD AND DEVICE FOR PARSING NATURAL LANGUAGE SENTENCES AND OTHER SEQUENTIAL SYMBOLIC EXPRESSIONS

[76] Inventor: Douglas E. Brash, 59 Bargate Trail, Killingworth, Conn. 06419

[21] Appl. No.: 08/922,494

[22] Filed: Sep. 3, 1997

[51] Int. Cl.[6] .................................................. G06F 17/27
[52] U.S. Cl. ................................ 704/9; 704/10; 704/235; 704/270
[58] Field of Search ................................ 704/1, 8, 9, 10, 704/270, 271, 275, 231, 235

[56] References Cited

U.S. PATENT DOCUMENTS

| | | | |
|---|---|---|---|
| 4,829,423 | 5/1989 | Tennant | 704/8 |
| 4,852,170 | 7/1989 | Bordeaux | 704/277 |
| 4,864,502 | 9/1989 | Kucera | 704/8 |
| 4,868,750 | 9/1989 | Kucera | 704/8 |
| 4,887,212 | 12/1989 | Zamora | 704/8 |
| 4,914,590 | 4/1990 | Loatman | 704/8 |
| 4,914,704 | 4/1990 | Cole et al. | 704/235 |
| 4,994,966 | 2/1991 | Hutchins | 704/9 |
| 5,047,953 | 9/1991 | Smallwood et al. | 704/271 |
| 5,068,789 | 11/1991 | van Vliembergen | 704/9 |
| 5,083,268 | 1/1992 | Hemphill et al. | 706/11 |
| 5,101,349 | 3/1992 | Tokuume | 704/9 |
| 5,146,406 | 9/1992 | Jensen | 704/9 |
| 5,210,689 | 5/1993 | Baker et al. | 704/1 |
| 5,297,040 | 3/1994 | Hu | 704/9 |
| 5,299,125 | 3/1994 | Baker et al. | 704/9 |
| 5,309,546 | 5/1994 | Baker et al. | 704/271 |
| 5,345,538 | 9/1994 | Narayannan et al. | 704/275 |
| 5,457,768 | 10/1995 | Tsuboi et al. | 704/231 |

OTHER PUBLICATIONS

Allen, J. Natural Language Understanding. Benjamin/Cummings, Redwood City, CA (1995) pp. 95, 295–296, 305–307, 332–334, and 341–342.

Beardon, C., et al. Natural Language and Computational Linguistics—An Introduction. Ellis Horwood, New York (1992) pp. 129–130, 133–134, 187–188.

Dowty, D. Introduction to Montague Semantics. D. Reidel, Boston (1981) pp. 180–183.

Joshi, A. Tree–adjoining grammers. In: Natural Language Parsing, D. Dowty et al. (eds). Cambridge Univ. Press, Cambridge (1985) pp. 206–209, 214–215.

Marcus, M. A Theory of Syntactic Recognition for Natural Language. MIT Press, Cambridge, MA (1980) pp. 2–6, 17–21.

Schank, R. Conceptual dependency. Cognitive Psychology 3:552–631, 1972. pp. 556–560.

Schank, R. Conceptual Information Processing, North–Holland, Amsterdam (1975) pp. 22–25, 37–39, 41–43.

Wilks, Y. Parsing English II. In: E. Charniak et al. (eds.) Computational Semantics. North–Holland, Amsterdam, pp. 155–184, 1976 pp. 169–173, 158–169.

Winograd, T. Language as a Cognitive Process: Syntax. Addison–Wesley, Reading, MA (1983) pp. 36–37, 46, 54–55, 73–76, 79–80, 139–143, 162, 196–198, 204–210, 314–317, 328–330, 334–337, 345–346, 349, 368–369, 560–562.

*Primary Examiner*—Joseph Thomas

[57] ABSTRACT

A parsing method and apparatus for symbolic expressions of thought such as English-language sentences is provided. The basic procedure distinguishes only between symbols for picture-like entities (such as "squirrel" or "justice") and symbols for relations (such as "above" or "pushed"). For example, to the cognitive parser the sentences "The squirrel buried a nut" and "My aunts sent a telegram" are equivalent. The parser thus operates at a level more basic than syntactic parsing, making it simpler. The illustrative embodiment, a cognitive parser for English sentences, comprises: a microprocessor, a stored lexicon including symbols and associated entity-types (picture or relation), an input device for a symbol sequence, and a procedure executing on the microprocessor for grouping the inputted picture-designating and relation-designating symbols according to rules based on entity type. A method comprising operation of the cognitive parser is also provided.

20 Claims, 17 Drawing Sheets

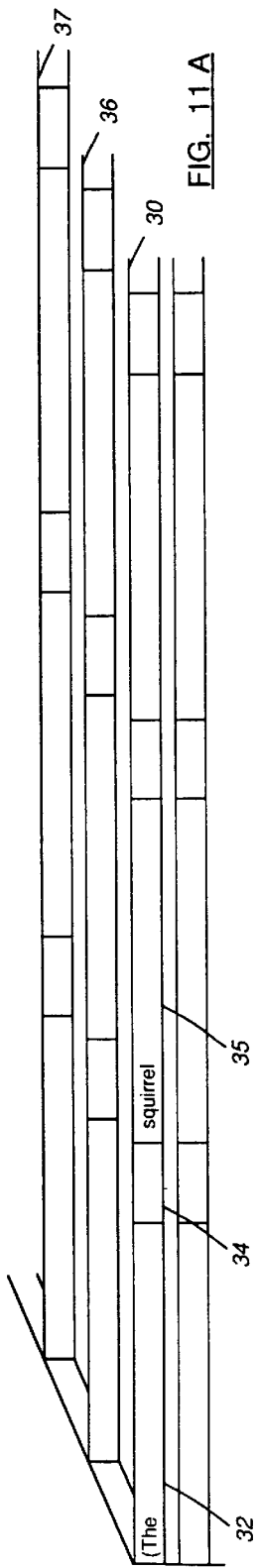
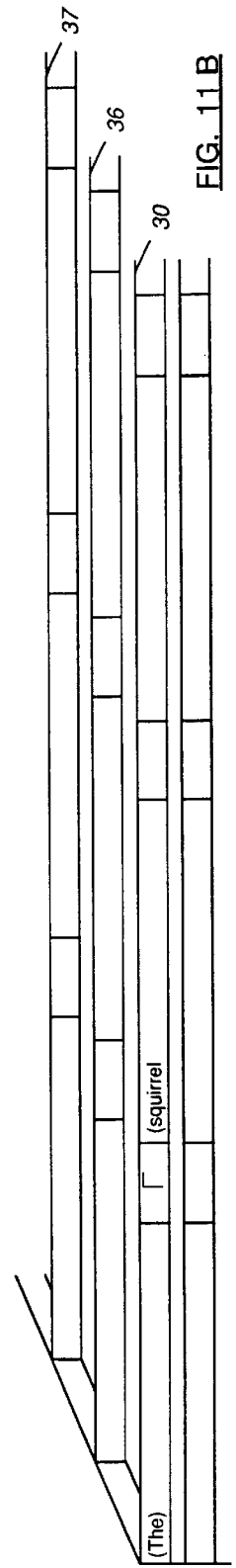
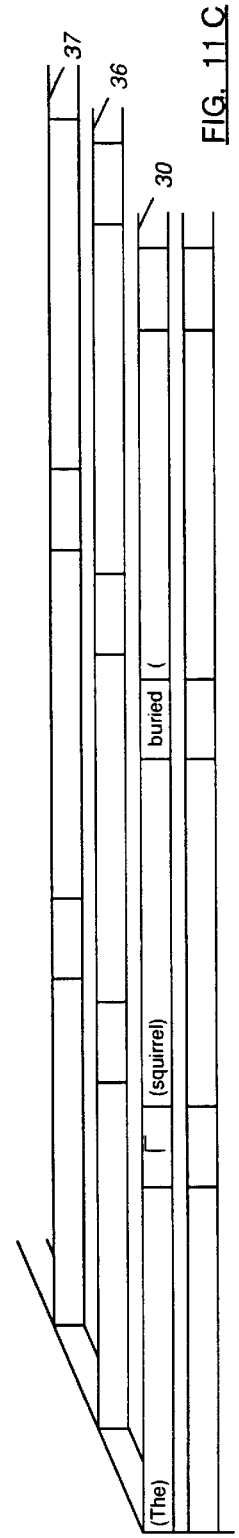
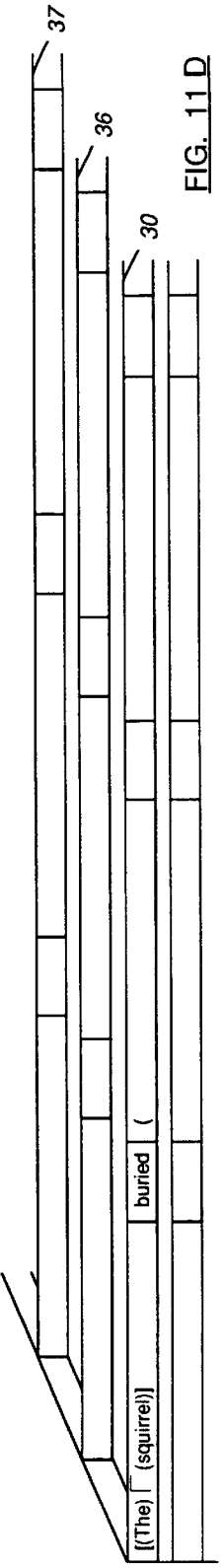

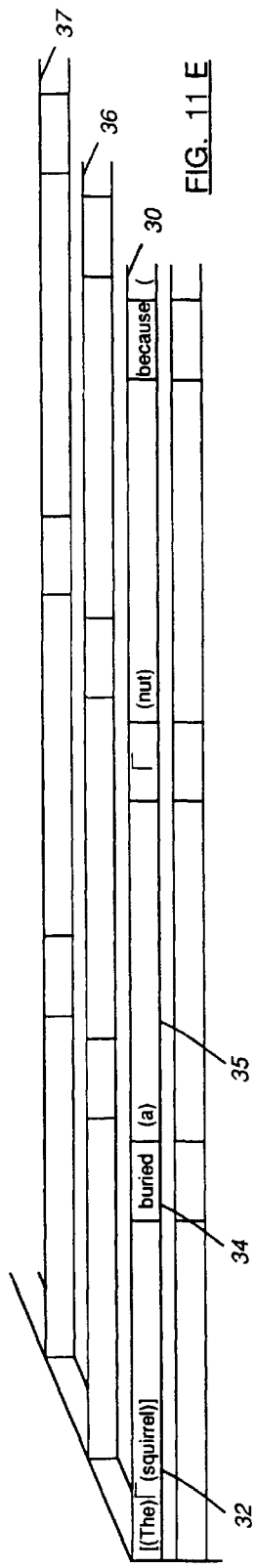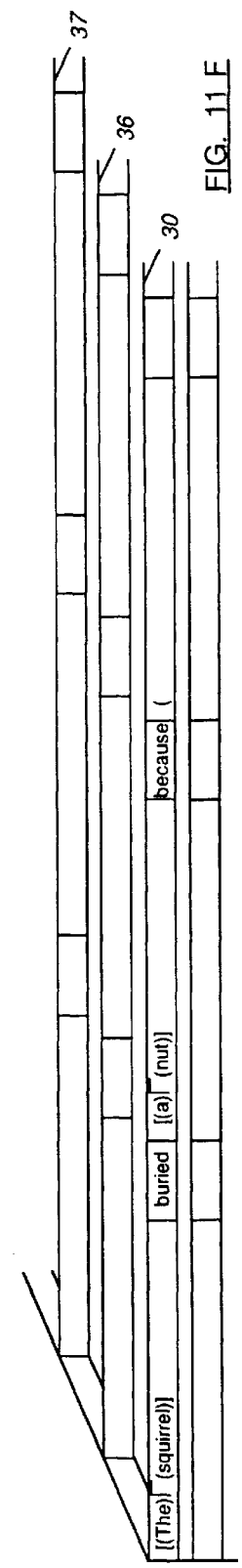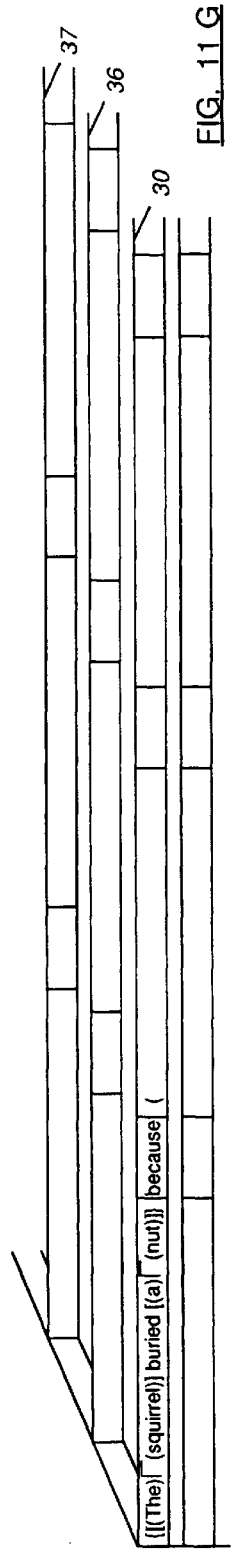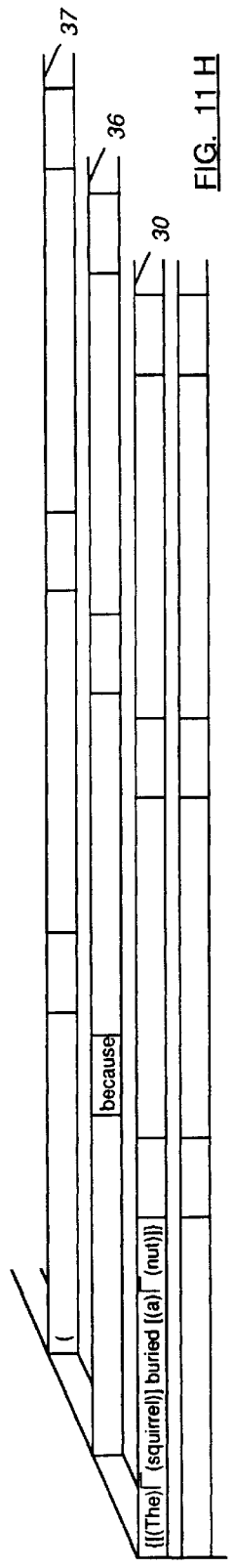

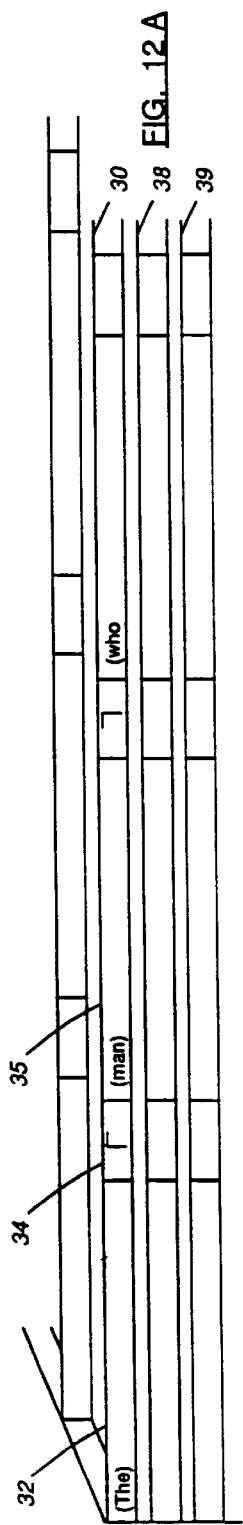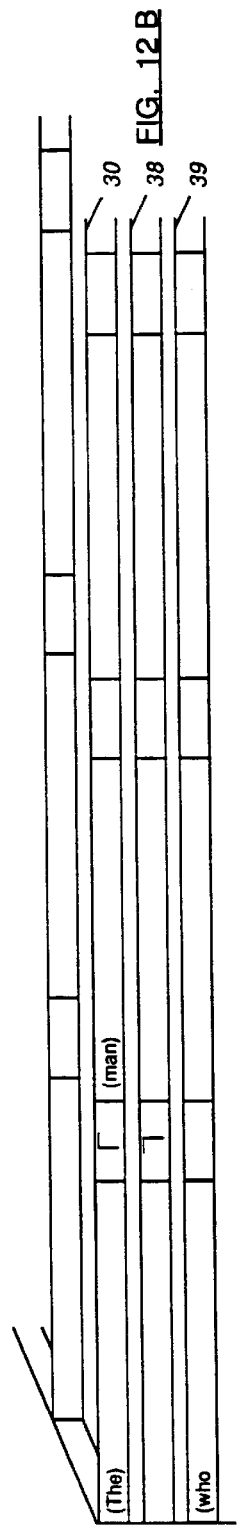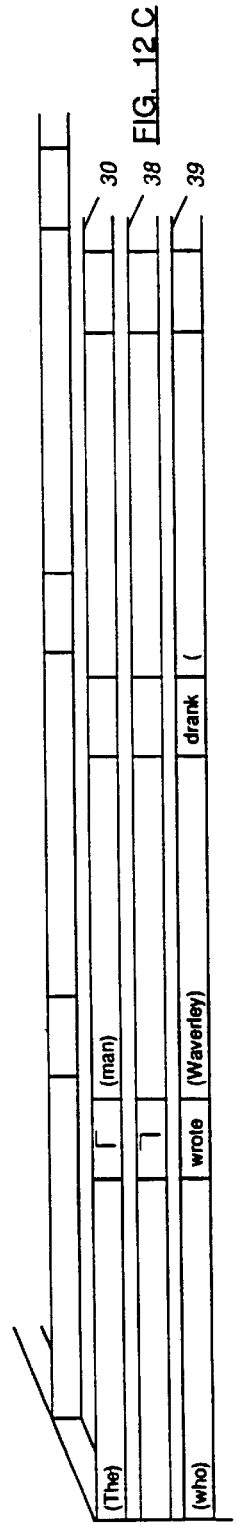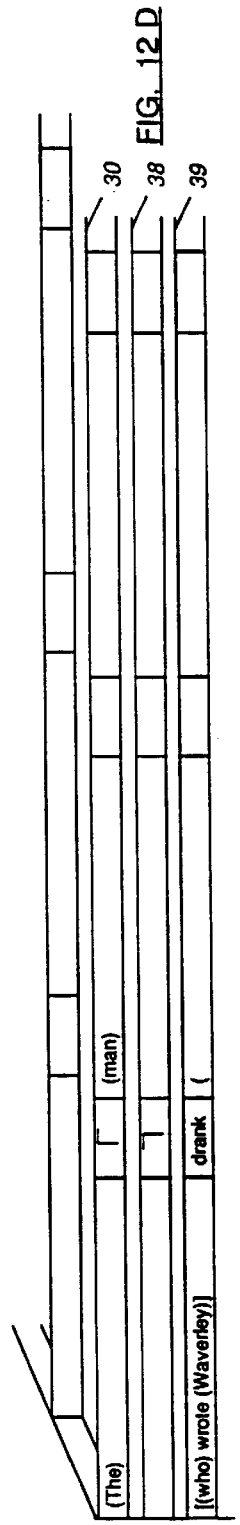

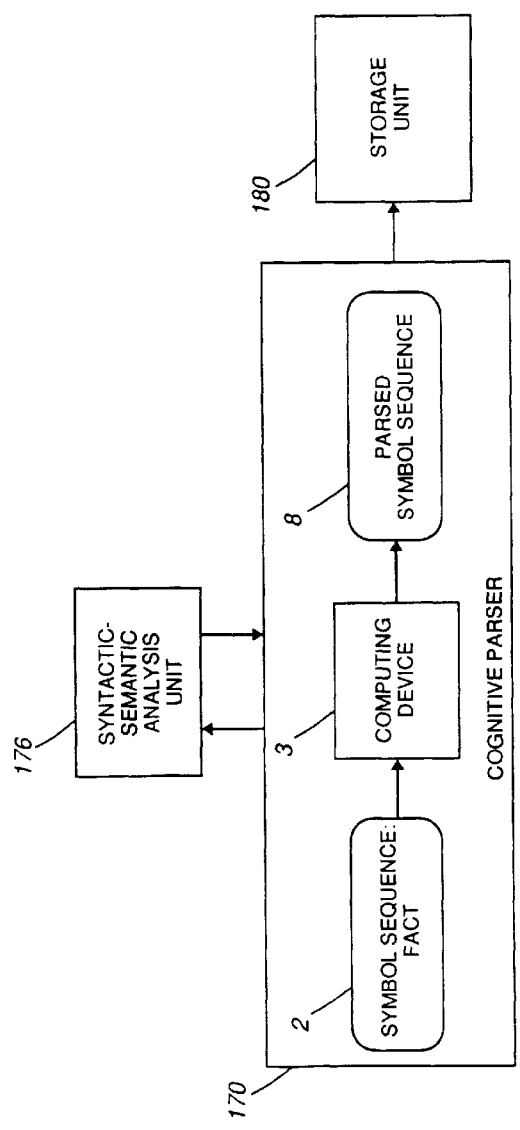
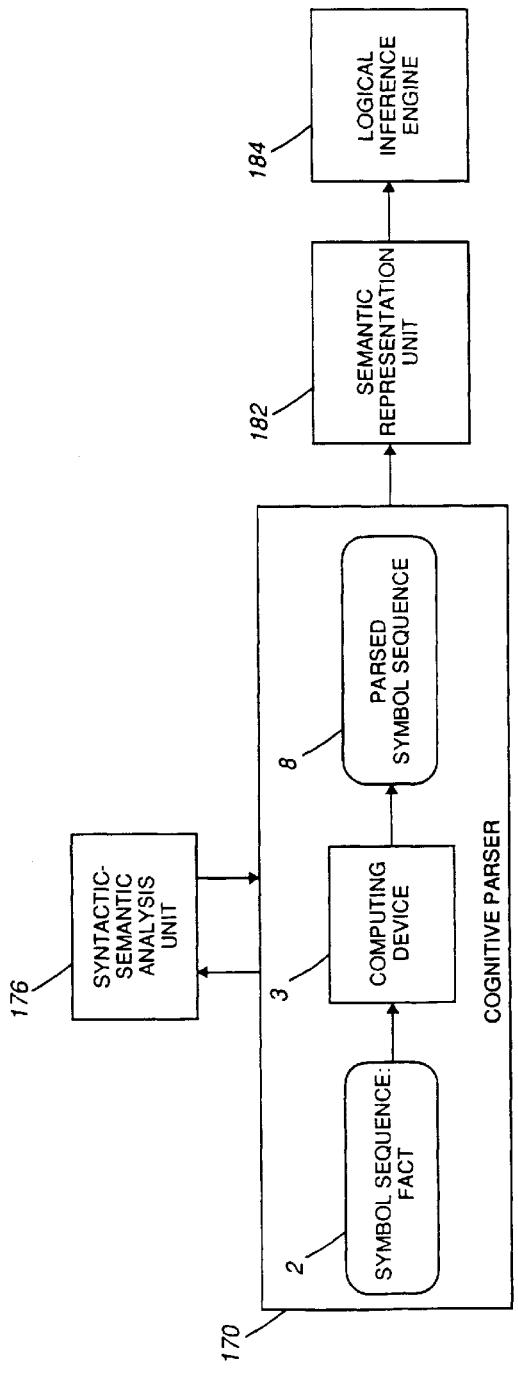

METHOD AND DEVICE FOR PARSING NATURAL LANGUAGE SENTENCES AND OTHER SEQUENTIAL SYMBOLIC EXPRESSIONS

FIELD OF THE INVENTION

The invention relates to a method and device for parsing natural language sentences and other symbolic expressions, and more specifically, the invention relates to a method and device for parsing natural language sentences and other symbolic expressions into cognitive units.

BACKGROUND OF THE INVENTION

A parsing device converts a linear symbol sequence into an organized structure. The diagrammed sentence encountered in grade-school grammar is one kind of parse. This organized structure can then be displayed for instructional purposes, or other devices can use it to initiate commands, store information, or make logical inferences. A parsing device is a prerequisite for using natural language to communicate with computers and, moreover, a simple parsing device is needed if natural language is to be used for controlling household devices such as kitchen appliances, videocassette recorders, lighting, and heating or air conditioning. The central problem in parsing is to achieve both accuracy and speed. For synthetic languages, such as computer languages, many effective solutions are available. However, the complexity and ambiguity of natural languages have made them resistant to efficient parsing.

Automated sentence parsing devices—usually general purpose digital computers—have operated by matching parts of the input sentence with a very large number of stored rules (Tennant et al., 1989, U.S. Pat. No. 4,829,423). If the first rule does not apply, the next is chosen for examination. Three broad classes of devices have been used; these employ increasingly deep levels of sentence analysis. The most common approach is Syntactic Parsing, in which the rules driving the parsing device describe the organization of words in a particular language. In practice, achieving a parse also requires resolving the possible senses of ambiguous words. This is done by a semantic interpreter, which uses information about word meaning. Semantic Parsing aims at the level of meaning directly, driving the parser with rules relating ordered words to the underlying meaning of the sentence. Conceptual Analysis also aims directly for the level of meaning, but does not attempt to preserve word order. Conceptual analysis parsers identify key words as tokens for the underlying objects or actions, and the organization sought is that of the objects being discussed rather than that of the words used to discuss them. The processor reconstructs this organization by using "encyclopedia information" about the objects, rather than "dictionary information" about the words.

These three approaches to sentence parsing will now be explained in more detail. In each approach, the stored rules can be either template-patterns, which must be matched exactly, or general rules, which are applied to parts of the sentence in succession to build a tree-like parsed structure of increasingly finer detail, from a sentence to its phrases to words. The successive-rule strategy, termed "generative," is combinatorial since rules can be used more than once in various combinations. Rules can be chosen so as to divide a sentence into smaller units ("top-down parsing") or, less frequently, to assemble words into higher-level units ("bottom-up" parsing). By storing the result of each successful pattern-matching or rule application, the parse accumulates aspects of the sentence's organization.

Syntactic Parsing

A Pattern-Matching parsing device accepts a sentence if each word matches part of a stored template of allowed words or parts of speech ("lexical categories," such as "verb"). To cover a language, a large number of template patterns are stored in advance and each compared to the input sentence. The result is a flat structure whose sentence organization is simply the before/after relation between words or lexical categories (Winograd, 1983, pp. 36–37, 46). More complex pattern-matching strategies build hierarchical structures using syntactic categories (e.g. "noun phrase"). These "head and modifier" structures include the classic Diagrammed Sentence, composed of a subject-verb pattern to which modifiers are attached, and Dependency Grammar, in which even the subject is represented as a modifier of the verb. However, the prior art does not emphasize identification of rules that would enable automated generation of such trees (Winograd, 1983, pp. 73–75). A practical pattern-matching device has been described that tags a sentence's words with symbols denoting the word's possible syntactic features, and then matches the pattern of tags to stored template-patterns of tags (Kucera and Carus, 1989, U.S. Pat. No. 4,864,502).

The Generative paradigm replaces the long list of template-patterns with a shorter list of rules involving mini-patterns; these rules are used combinatorially and repetitively. Flat structures are generated by Transition-Networks, in which rules about the succession of words or lexical categories are embodied as transitions allowed between states of the parser (Winograd, 1983, pp. 54–55). If the input word matches a lexical category allowed for the current parser state (e.g., "adjective"), the parser switches to the next state. There it has a new set of allowed categories and the next word must match one of these. The resulting parse is flat, indicating only which lexical categories follow each other in the sentence.

Hierarchical structures can be constructed generatively, however. Recursive Transition Networks allow transition networks to accomplish a hierarchical parse by allowing parser transitions to be triggered not only by lexical categories like "adjective," but also by syntactic categories such as "noun phrase" (Winograd, 1983, pp. 196–198). Deciding whether the input sentence contains a noun phrase, however, requires first activating additional transition networks for describing the constituents of noun phrases. Immediate-Constituent Grammar parsers build the tree-like structure by using a list of rules that relate two levels of structure (Winograd, 1983, pp. 75–76). The list includes rules linking sentences to noun-, verb-, and prepositional phrases; these to lexical categories such as noun, adjective, and determiner; and these to specific words. An example is: sentence→noun phrase+verb phrase; noun phrase→determiner+adjective+noun; verb phrase→verb+adverb+direct object. Successive application of the rules produces a tree of increasing detail: parsing a sentence is achieved by successively checking each rule in the list for fit to the input sequence of words, and choosing from the rule list those that match. One list of rules, one grammar, is capable of building many different trees. The particular tree that results depends on the subset of rules that matched the particular sentence's words.

In Role Structures parsers, the syntactic categories are themselves in effect constituents of a pattern of syntactic roles (such as the pattern "subject-object") (Winograd, 1983, pp. 79–80). Word tags can also be processed generatively (Hutchins, 1991, U.S. Pat. No. 4,994,966). A related strategy is to copy the dictionary entries of the words of a sentence directly into memory, and then use the grammar rules to directly remove properties from, or add to, these dictionary entries (Zamora et al., 1989, U.S. Pat. No. 4,887,212).

A disadvantage of the above devices is that they use context-free grammars and are thus inadequate for sentences that have long-distance dependencies. Such dependencies arise from number/case agreement, passive-voice constructions, and questions. Transformational Grammars use a series of context-sensitive rewrite rules to transform a context-free syntactic tree structure into another tree that matches the word order found in, for example, the passive voice (Winograd, 1983, pp. 139–143). However, these processes have not been widely incorporated into devices (Winograd, 1983, p. 162).

Phrase Structure Grammar uses immediate-constituent rules, but adds "derived constituents" of the form "verb phrase but missing x." For example, a derived constituent like VP/NP carries the information that a noun phrase is missing from the verb phrase. Long-distance dependencies are resolved by using semantic knowledge to find an NP that fills in this hole (Winograd, 1983, pp. 345–346). The strategy most frequently used in practical parsers is the Augmented Transition Network (Loatman et al., 1990, U.S. Pat. No. 4,914,590). Here, the recursive transition network's set of allowed transitions between parser states is supplemented with registers that record a word's features, such as number or gender, and a word's role, such as subject, object, or determiner. Rules governing the allowed transitions are made dependent on the condition of these registers (Winograd, 1983, pp. 204–210). In this way, long-distance dependencies are incorporated. Charts are kept of the intermediate states of the parse to improve efficiency.

A completely different generative approach is Tree-Adjoining Grammar, which combines not rules but trees (Joshi, 1985). Each initial tree, actually a "mini-tree," describes a sentence fragment. These are combined to build a tree for the complete sentence. By collecting several rules into one mini-tree, a long-distance dependency can be incorporated from the outset as a mini-tree having links between two of its branches. However, since each mini-tree represents just one of the combinations of several rules, the initial stock of mini-trees is very large. The number of tree-choice decisions is accordingly large and the parsing time is proportional to the fourth power of sentence length. A "molecular parsing" device has been described in which each word's dictionary entry contains both phrase structure rules and template-patterns for the word's possible successors (Hu, 1994, U.S. Pat. No. 5,297,040).

Implementing these syntactic parsing approaches has not been straightforward, for two reasons. First, a correct parse requires a single grammar rule to be chosen at each word. But the correctness of a rule is usually not evident until several words later. Therefore, the large number of rules required to capture real sentences means that the device will pursue many fruitless parsing paths, followed by backtracking when the parse becomes clearly incorrect. This rule-choice problem has fostered strategies to minimize the time spent on fruitless parsing paths, including pursuing multiple parses in parallel or retaining information about partially-successful parses (Winograd, 1983, pp. 368–369).

Some parsers prune the parallel parsing paths by using syntactic rules to assess the likelihood that the parse thus far is correct (van Vliembergen, 1991, U.S. Pat. No. 5,068,789). The Deterministic Parsing conjecture asserts that, for sentences that can be understood without difficulty, a parser need not backtrack or construct the alternative parses that arise from rule-order choice (Marcus, 1980, pp. 2–6). The parsing is deterministic in that, once built, nothing can be unbuilt or ignored. The deterministic parser achieves this result by viewing not just one word at a time, but a 3- to 5-constituent window constructed from the incoming sentence (Marcus, 1980, pp. 17–21). Incoming words and already-built constituents are stored in a first-in first-out buffer, the first 3–5 positions of which are available to the parser. New constituents are built from these in a separate push-down stack. The syntactic tree is built using syntactic pattern-matching rules and semantic case rules that involve both the stack and the buffer. Few reports on this method have appeared since the original description.

The second problem in syntactic parsing has been that words in natural languages often have multiple meanings; yet, the parsing strategies described above require that the correct meaning be identified before the parse can be completed. One strategy has again been to try each of the alternative possible parses, most again fruitless. Alternatively, parsers have reduced ambiguity by using co-occurrence relations—statistical information on the frequency with which words are found together (Kucera et al., 1989, U.S. Pat. No. 4,868,750).

Semantic Interpretation of a Syntactic Parse

More direct reduction of word ambiguity, and rule choice, has been sought by associating word-meaning information with each element of the syntactic parse tree after the syntactic tree is constructed. Semantic interpretation then usually uses a Pattern-Matching strategy against stored semantic template-patterns. These stored patterns can be of several types. Selection Restriction Rules specify the objects with which a given word may have a relation; these are embodied as arguments to the word's entry in the dictionary, or "lexicon." An example is: "green"+(physical object) →green color (Allen, 1995, pp. 295–296). Rather than denoting a meaning, these rules lead to a choice among previously-cataloged meanings. Semantic Network patterns are hierarchies of object-types or action-types, based on semantic primitives, which the designer constructs in advance. If the semantic network also includes "semantic functions," such as "agent," "instrument," or "result," it can be used to limit the possible senses of a word (Allen, 1995, pp. 305–307). In actual devices, such hierarchies are implemented as a nested list.

Case Grammar is related more to the fixed patterns in which meanings tend to occur ("semantic case" patterns) than to the meanings themselves. Examples are agent, instrument, and theme. The semantic case of a word or phrase depends on its position with respect to the verb, just as the familiar syntactic cases like subject and object do. Since verbs are restricted in the semantic cases they allow, the parser can identify semantic case patterns using syntactic patterns found in the syntactic parse (Winograd, 1983, pp. 314–317). Alternatively, semantic case patterns can be identified independently of specific verbs by having the parser derive them from syntactic case patterns; for example, the identification of a direct object in the syntactic parse implies the presence of an agent and a theme in the semantic interpretation (Beardon et al., 1992, pp. 133–134).

Other strategies are less often used in practical parsing devices. Systemic Grammar uses hierarchies of template-patterns based not only on semantic functions, but also on word and pragmatic functions. The functions are arranged into systems organized as a tree of choices: mood (question, statement, command); transitivity (actor, action, goal; agent, instrument, result); theme (focus of attention); and information (already-given, new) (Allen, 1995, p. 95; Beardon, 1992, pp. 187–188). These patterns are reflected in the sentence's word order and lexical-category patterns. Thus, a degree of semantic information emerges once the correct lexical category pattern is matched.

Functional Grammar uses hierarchical template-patterns that combine, in a single notation, syntactic elements such as voice, syntactic categories such as "noun phrase," and semantic elements such as "actor." Such patterns are stored in advance for the various types of sentence fragments. It differs from systemic grammar in emphasizing matching the pattern, rather than deriving the hierarchical pattern from word patterns (Winograd, 1983, pp. 328–330). Parsing by any of these pattern-matching procedures assembles overlapping sentence-fragment template patterns. Such pattern-matching strategies have had limited application in practical devices, as they do not readily parse complex sentences or languages with large vocabularies.

Several parsing devices use Generative methods, building semantic structures that correspond to the syntactic parse tree. The semantic rules are incorporated within the syntactic rules that the syntactic parser uses. Of these, Definite Clause Grammar supplements the immediate-constituent grammar rules with further information about word features, possible word roles in the sentence, and semantic functions (Winograd, 1983, p. 349). These rules are expressed in predicate calculus; parsing then uses a theorem-prover algorithm.

Lexical-Functional Grammar supplements a syntactic tree with a semantics-like tree (Winograd, 1983, p. 334–337; Tokuume et al., 1992, U.S. Pat. No. 5,101,349). To achieve this, the designer first identifies rules governing the inheritance of word features, word roles, and semantic functions down a context-free constituent-structure tree. He assigns to each constituent in an immediate-constituent rule an equation that describes the relation between the features, roles, and functions of the parent node and those of the child node. Thus, the parser will build a feature/role/function tree as it builds the syntactic tree. In addition, the parser uses a detailed dictionary that includes feature/role information about each word and its possible arguments. This word information will then percolate up through the feature/role/function tree. The rules for the syntactic tree can be simple; though they would allow many incorrect sentences, the constraint resulting from solving the set of feature/role/function equations results in a correct parse. The parser solves this set of simultaneous equations instead of pursuing all of the parsing paths made possible by an ambiguous word.

The large number of rules in the various strategies described above has had the consequence that many natural language understanding systems are limited to a domain-specific knowledge base, such as a database, medical reports, or inventory control.

Two additional strategies for semantic interpretation do not seem to have led to parsing devices. Generative Semantics takes the point of view that syntax and semantics should have the same rules. The semantic structure is a logical proposition whose predicates and arguments are arranged as immediate-constituents forming a tree (Winograd, 1983, pp. 560–562). Semantic rules are of the form: proposition→predicate+arguments; argument→another proposition or an "index"; index→a proper noun or a phrase denoting a variable. The main concern of generative semantics has been generating the syntactic tree from the proposition, rather than from a natural language text.

Montague Semantics asserts that both the syntax and semantics of natural languages obey formal laws (Dowty, 1981, pp. 180–183). Each compositional syntactic rule is associated with a parallel compositional semantic rule. The syntactic analysis uses a phrase-structure grammar's derived categories (see above) to construct a syntactic tree, but with a very large hierarchy of syntactic constituent-types that corresponds to the hierarchy of logical types found in the predicate calculus of the semantics. In the semantics portion, the meaning of a word is defined as being the word's referent—specified by membership in sets of individuals or sets of properties. Montague semantics focusses on building precise specifications of set-membership. In principle, the syntactic analysis would automatically generate the semantic representation. But focussing on set membership does not address word ambiguity, and the approach appears to have been used only on small subsets of English.

All of the parsing methods described thus far are based on syntactic information: knowing which word types—nouns, verbs, adjectives, auxilliaries, singulars, plurals, nominative forms or objective, active voice constructions or passive, various tense forms—can follow each other in a sentence.

Semantic Parsing

Strategies have also been devised for parsing sentences directly into a semantic structure, without a syntactic tree. A Pattern-Matching strategy is Semantic-Directed Parsing, in which the parser matches the input words against patterns of semantic selection-restriction rules (Allen, 1995, pp. 341–342). These rules use word-word patterns to choose among stored object-object patterns reflecting the real world. Words are matched to selection restriction rules either directly or by using a lexicon that portrays each word as a type hierarchy. Since the patterns being matched are based on individual words, each word sense requires a different stored pattern. Linguistic generalizations are thus precluded, and the method requires either a large number of patterns or, as is usually the case in practice, a small vocabulary.

A Generative approach to semantic parsing is Semantic Grammar, in which immediate-constituent rules use semantic-like categories or special words (Allen, 1995, pp. 332–334; Beardon et al., 1992, pp. 129–130). A set of rules for airline reservations might be: reservation-phrase→reservation+reservation-modifiers; reservation→reservation-verb+flight#; reservation-modifiers→"for"+name. Such rules are domain-specific. Also, the parser must have a separate rule for each syntactic variant, such as passive voice.

Conceptual Analysis

More ambitious is the attempt to parse a sentence according to the concepts it represents. This is done by viewing words as tokens for the underlying objects or concepts. The processor assembles this information by using "encyclopedia information" about the objects, rather than "dictionary information" about the words. Because words are of course the input for such parsing, even though it is their referents that are being analyzed, conceptual analysis can be difficult to discern from semantic parsing. A useful diagnostic is that conceptual analysis does not attempt to preserve word order. Consequently, conceptual analysis devices are not true natural language parsers.

A conceptual Pattern-Matching strategy is Preference Semantics, in which the parser matches conceptual structures for each input word against a set of templates for the conceptual structures of commonly encountered messages (Wilks, 1976, pp. 158–169). Each word's conceptual structure is represented in its lexicon entry as a tree of semantic primitives based on object-types and actions. Each sense of a word has its own tree, each tree also noting that sense's semantic case. The highest level of the tree is a broad category, such as "person," and is used for finding an appropriate slot in a template.

Templates are of the general form: agent/action/object; particular templates are more specific, such as "person/be/attribute." The parser substitutes the tree of each sense of each word into each of the stored templates, seeking a conceptual match. Adjectives, adverbs, and determiners are skipped until later. All matches are retained. The "preference" aspect of the parser arises in the next step, in which the multiple matches are winnowed. The semantic cases in the words' conceptual trees are used to identify preferred relations between lexicon entries; for example, some actions prefer a human agent. Similar preference rules are then used to place the adjectives, adverbs, and determiners. Thus, assembly of the conceptual structure is relatively independent of word order.

In practice, these assembly procedures are applied to fragments generated by subdividing the sentence, primarily at prepositions. Afterward, each conceptually-assembled fragment is tied to the next sentence-fragment by a "case tie," identified by matching each template against stored super-templates ("paraplates") for common case patterns. Each paraplate involves one sense of the preposition that starts the second template, and has the structure: (agent/action/object)1//case tie//(agent/action/object)2. Fragment-tying thus appears to be syntactic or semantic rather than conceptual. The resultant parse is an organized structure of semantic primitives, rather than a structure built of the original words.

A Generative approach to conceptual analysis is Conceptual Dependency. In this approach, each word's underlying concept becomes joined to the others not because they each match part of a stored message pattern, but because each concept in the lexicon is accompanied by expectations about its potential partners (Schank, 1972, pp. 556–560; Schank, 1975, pp. 22–25, 37–39, 41–43). In effect, the analyzer uses conceptual selection-restriction rules to assemble a structure.

First, syntactic procedures identify the main verb, the main noun, and the words and phrases that depend on these syntactically (Wilks, 1976, pp. 169–173). However, a syntactic tree is not produced. Instead, the lexicon is used to replace the verb with a conceptual dependency structure based on conceptual primitives; this structure is annotated with conceptual case information, similar to semantic case. The conceptual cases predict other conceptual items expected in the sentence, such as agents and recipients, for which the parser then searches. These are found by comparing unused sentence elements to syntactic patterns that have been prestored.

A related device identifies the sentence's semantic arguments for syntactic elements, such as the verbs, by using as an input an extensively-annotated syntactic parse (Jensen, 1992, U.S. Pat. No. 5,146,406). It then assembles the argument structure of the sentence without preserving word order. In both conceptual-dependency and preference-semantics parsers, the prior syntactic manipulation required is a major impediment to a purely conceptual analysis.

The disadvantages of present parsing methods are thus complexity, large required processor size, limited vocabulary, and slow speed. These disadvantages stem from the large number of syntactic rules used and the incorporation of semantic information to resolve ambiguities.

What is desired, therefore, is a parsing method and device which would utilize a small number of rules, minimal semantic information, and minimal computing power. Such parsing method and device would require minimal disambiguation of words having multiple meanings and would not rely on specific knowledge bases, word co-occurrence probability data, selection-restrictions, frames, or expectations about sentence content. Such parsing method and device would also process symbol strings in a time proportional to sentence length.

SUMMARY OF THE INVENTION

Accordingly, it is an object of the invention to provide a system to parse thought expressions, such as natural language, using a small number of rules, thereby minimizing rule-choice decisions.

Another object of the invention is to provide a system to parse thought expressions, such as natural language, using minimal semantic information.

Still another object of the invention is to provide a system to parse thought expressions, such as natural language, using minimal computing power.

Yet another object of the invention is to provide a system to parse thought expressions, such as natural language, with minimal disambiguation of words having multiple meanings.

Another object of the invention is to provide a system to parse thought expressions, such as natural language, without limiting the vocabulary to a specific knowledge base.

Still another object of the invention is to provide a system of the above character to parse even surprising thought expressions by avoiding word co-occurrence probability data, selectional restrictions, frames, and expectations.

Yet another object of the invention is to provide a system of the above character to parse while the expression is being entered into a processor.

Another object of the invention is to provide a system of the above character to parse in a time period corresponding linearly to sentence length.

The invention is a system for parsing symbol sequences representing thoughts, using a small set of rules herein termed "cognitive rules." The basic rule distinguishes only between symbols for pictures and symbols for relations. In addition, the rules use the symbols for relations as signals for particular parsing procedures. In the illustrative embodiment of the invention discussed hereinbelow, which processes English sentences, the parser: i) divides the sentence into words for pictures and words for the relations between pictures and then ii) assembles picture-designating symbol/relation-designating symbol/picture-designating symbol sequences into symbol groups that constitute new picture symbols, using rules for detecting picture borders. The invention is thus a "bottom-up generative cognitive parser."

Theory of Operation

Against a background of complex natural language parsers is introduced cognitive parsing, which distinguishes primarily between symbols for picture-like entities (such as "squirrel" or "justice") and symbols for relations (such as "above" or "pushed"). In the general sense used here, a picture can be a sound, feeling, past experience, or concept as well as a visual image. When the symbols are words, such pictures are symbolized by nouns, adjectives, and pronouns, including relative pronouns such as "that" and "which." Relations are typically symbolized by prepositions and verbs. The underlying idea of cognitive parsing can be quickly conveyed by noting that the cognitive parser does not distinguish between "The squirrel buried a nut" and "My aunt sent a telegram." In both cases a relation (the verb) separates two pictures, thereby parsing them. Cognitive parsing operates at a level more basic than syntactic parsing or conceptual analysis. This simplicity allows it to use only three rules, together with about a dozen criteria for deciding when to apply these rules.

Cognitive parsing recognizes that the organization of words in a sentence seems to reflect an underlying cognitive structure built of pictures and relations. The cognitive parser's fundamental operations are a) scanning the input symbol sequence for "picture" and "relation" symbols, b) using the relation symbols to segregate the picture symbols, and c) assembling picture and relation symbol sequences into symbol groups that constitute new picture symbols. Since the distinction between "picture" and "relation" is a primitive form of meaning, and symbol order is preserved, a cognitive parser used for words is a type of semantic parser. The primitive nature of these cognitive rules also allows a cognitive parser to apply them to thought-expressions other than words, such as a string of signs in American Sign Language. The operations the parser performs will be explained by first describing the desired final parsed structure, termed "cognitive form," followed by a description of the procedures that the parser uses to build this structure.

Cognitive Form

When we see a squirrel burying nuts, we are aware of the squirrel, the nuts, and the activity of burying. Similarly, the sentence "Squirrels bury nuts" can be divided into picture-relation-picture form: (Squirrels) bury (nuts). The verbal relation "bury" acts as a parsing element in languages that use this word order. The picture-relation-picture form, hereafter abbreviated "P rel P," can itself be a "picture", (P rel P). Such a picture is referred to herein as a "picture-symbol group"; e.g., ((Squirrels) bury (nuts)). More complex sentences can be shown to have the same (P rel P) form, with various other types of relations such as prepositions acting as parsing elements: ((Squirrels) bury (nuts)) under (trees). [((Squirrels) bury (nuts)) under (trees)] when [(it) is (Fall)]. The square parentheses are used for clarity and do not differ in principle from ordinary parentheses. These structures can be written using an immediate-constituent rule: P rel P→P. This rule differs from those of immediate-constituent grammars in the prior art because i) it generates a tri-forked tree, rather than the bifurcated tree which the standard subject-predicate division generates and ii) each level of the tree uses the same immediate-constituent rule.

Rules similar to those for the illustrative embodiment, which parses English sentences, could be used to parse a language or symbol system whose cognitive form is instead constructed of, for example, (P P rel) symbol groups. Such rule modifications would be apparent to one skilled in linguistics in view of the cognitive parsing procedures described herein; therefore, the procedures for their implementation will not be discussed herein.

The usefulness of (P rel P) structures for natural language parsers has escaped notice for two reasons. First, a great deal of linguists' efforts have gone into devising methods capable of parsing non-physiological sentences, sentences which a proficient user of the language would not actually say. An example of such a sentence is "John passed a train with a broken locomotive." A typical proficient user of the language would have said either "John passed a train that had a broken locomotive" or "John passed a train while he was in a broken locomotive." The example sentence constitutes a puzzle which listeners are able to solve by using semantics and world-knowledge. But focusing on such aberrational sentences obscures the power of simpler procedures which can be applied to parse sentences that are properly formed.

A cognitive parser (alone, without a semantic analyzer) is not intended for parsing non-physiological sentences, or for parsing "garden path" sentences, such as "The horse raced past the barn fell." Instead, it is designed for parsing sentences that are grammatically acceptable. The fact that in English these grammatically acceptable sentences have a (P rel P) structure appears to have gone unnoticed.

The second reason that the usefulness of (P rel P) structures for parsing has not been noticed is that the relations are often omitted from sentences. A phrase such as "red squirrel" appears to lack on its face a P rel P structure. However, upon closer examination, the P rel P structure is evident since the phrase means "(redness) component-of (squirrel)". That is, an adjective carries with it both a picture and the relation needed to complete the P rel P structure. If, following Frege, the number two is treated as representing the set of all pairs, then "two red squirrels" is: (two) composed-of [(red) component-of (squirrels)]. For simplicity, "composed-of" will be abbreviated[, which can be thought of as enfolding the component. "Component-of" is abbreviated]. The result is: (two)[[(red)](squirrels)]. Gerunds, participles, and infinitives also have a (P rel P) structure. The gerund "burying" means "something buries something," which has the form (P verb P). The two "something"-s are of course omitted in English. The full form accounts for the ability of "burying" to have an object or adverb. The verb in this structure differs from the main verb in a sentence by not asserting truth.

Unexpectedly, cognitive form often correctly represents the underlying meaning where traditional syntactic structures are incorrect. For example, the head and modifier structure (diagrammed sentence) for "two red squirrels" has "two" and "red" each modifying "squirrels"; but "two" must actually modify "red squirrels," since only red squirrels are being counted. The correct structure is embodied in the cognitive form given above.

A separate aspect of cognitive form is its recognition that two thoughts can occur in parallel. In "The preacher's son and the farmer's daughter were married," the listener envisions "the preacher's son" and "the farmer's daughter" simultaneously. The sentence can be parsed by having the parser place the two phrases on separate processing tracks, separate but identical workspaces, and then determining the scope of the conjunction by pattern-matching between the two phrases. The matching procedure is not described herein, as it would be apparent to one skilled in the art.

The parallel processing tracks motivated by conjunctions are also useful for commas and relative clauses. For example, the two statements in "The man, who wrote *Waverley,* drank port" are independent and are thus merely associated with each other. The sentence is represented in cognitive form as follows:

{[(The)[(man)] drank [port]}
associated-with
{[who] wrote [*Waverley*]}

(If desired, "who" can easily be substituted with "(The)[(man)".) The three lines of this form are generated on separate tracks in the cognitive parser. The final structure is a (P rel P) form: { } associated-with { }.

Since easy-to-understand sentences have a nested (P rel P) structure, this structure can be used as a well-formedness criterion to fill in the missing portions of poorly-formed sentences. For example, "They made him director" must be missing a relation between "him" and "director." Since the job "director" has been instantiated with "him," the missing relation is "component-of." Similarly, the well-formedness criterion facilitates disambiguation. In "He saw the saw," "(He)" is a picture and so should be followed by a relation such as the verb sense of "saw." Because "the" represents "(the)[", it should be followed by a picture such as the noun sense of "saw." Disambiguation between different noun or verb senses (e.g., river bank and financial institution) is not needed, because cognitive parsing distinguishes only between pictures and relations.

Picture-Symbol Grouping Procedure

The (P rel P) form motivates a simple procedure to parse symbolic expressions. Instead of, for example, dividing a sentence into subjects, predicates, objects, and clauses, it is divided into pictures. This can be done readily, since between words for any two pictures lies a word for a relation. A local rule can be used to implement what will be termed the picture-symbol grouping procedure: The parser writes outward-facing parentheses on both sides of any word that denotes a relation. For example: "Squirrels) bury (nuts". The remaining parentheses are generated by periods—relations between sentences—that end this sentence and the previous one: "(Squirrels) bury (nuts)." The result is that each parenthesis indicates the border of a picture-word; a right-facing parenthesis indicates the beginning, and a left-facing parenthesis indicates the end. Note that the choice of parentheses as markers herein is arbitrary; therefore, other markers may be used to denote the same thing.

An unanticipated consequence of this parsing procedure is that gaps are left for the pictures missing from sentences having intransitive verbs and imperatives: (He) ran ( ). ( ) Answer (the telephone). The gap resulting from the intransitive verb corresponds to the understood object, which is the same as the subject—"he" or "himself." The gap in the imperative is for "you." Such gaps, created by more elaborate methods in some syntactic parsing methods of the prior art, are useful for subsequent semantic interpretation.

Another unanticipated consequence is the form of the passive voice. Recalling that a participle such as "buried" is a picture because it can be represented as "(something buries something)", the passive form of "squirrels bury nuts" is:

(Nuts) are [(buried) by (squirrels)].

Whereas typical grammar treats passive voice as a word rearrangement, cognitive parsing has generated a form equivalent to a conceptual difference—ascribing a property (having been buried by squirrels) to what in the active voice was the object (nuts). After replacing "buried" by "something buries something," this form would then allow a semantic interpretation device to substitute "squirrels" into the first "something."

A third unanticipated consequence of cognitive parsing is that perfect tenses such as "had buried" can be taken literally as "had the property 'buried'". A semantic interpreter can use this form to process tense in a novel way, rather than treating "had" as an "auxiliary verb": The interpreter can conclude that if the squirrel possessed the property "buried the nuts" in the past, it must have acquired it before then; that is, the burying occurred prior to the time in the past being discussed.

Hierarchy-Building Procedure

The picture-symbol grouping procedure, alone, gives a flat structure, such as "(Squirrels) bury (nuts) before (Winter)." Higher-level pictures are built by a hierarchy-building procedure in which, each time a relation is encountered, a hierarchy-building decision is made for the pictures that preceded it: Each time the parser encounters a relation, it not only adds the outward-facing parentheses but may also build a new picture by bracketing any (P) rel (P) preceding the relation.

This augmentation gives:
(Squirrels) bury (nuts
[(Squirrels) bury (nuts)] before (
{[(Squirrels) bury (nuts)] before (Winter)}.

The additional parentheses thus indicate borders for larger picture-symbol groups.

Picture-Borders

The complexities and vagaries of real sentences enter cognitive parsing as vagaries in the rules for picture-borders. Relation-words can be complete, strong, or weak picture builders depending on whether successive hierarchy-building continues all the way back to the beginning of the sentence or stops at a prior word that acts as a border. Complete builders are: the period between sentences; verbs; higher relations (relations that can join statements, such as "because"); path prepositions (such as "through"); and the comma at the end of a parenthetical expression. Strong builders include most prepositions, and are blocked by "the." Weak builders are blocked by any relation except]; these prepositions, such as "of," closely relate the pictures following and preceding. Additional borders will become apparent in special situations to be discussed.

Since the differences in picture-building behavior do not fall along part-of-speech lines, they are semantic properties rather than syntactic ones.

2-P Procedure

The parser uses the (P rel P) well-formedness criterion to regenerate missing relations in several situations. When two successive picture-words appear in a sentence, we know only that the two P's were associated in the speaker's mind. The (P rel P) criterion would tell us where to insert the minimal relation "associated with." However, the relation omitted in English seems to be always either] or[. Knowing which P is more specific determines the choice between the two. Thus missing relations can be regenerated by employing primitive semantic information.

We will term this the 2-P procedure: If two P's are encountered in succession, the parser inserts either "composed of" or "component of" between them. The more specific or sensation-related of the two P's is presumed to be a component of the other. If they are equally specific, the relation is]. If the second P is a determiner, the relation is[. The scale used by the illustrative embodiment to group picture-words into a hierarchy, ranging from sensory-related to abstract, is: sensation, constellation (of sensations), object, act, representation, set, sign, mental object, class (of objects), activity (class of acts), generator (of a lower category). Note that one of skill in the art could derive other scales of abstractness from references such as Roget's Thesaurus or the machine-readable edition of the Longman Dictionary of Contemporary English.

The 2-P procedure generates correct adjective structures even if adjectives are treated as pictures ("redness") rather than as pictures-plus-relations ("redness]"): (red)] (windmill), (the)[ (windmill). It also generates correct multi-adjective structures: (the)[[(red)](windmill)]. The 2-P procedure also gives: They made . . . (him)](director). Our . . . (son)[(John) . . . The 2-P procedure furthermore parses noun-noun modifiers such as "(dog)](house)."

The illustrative embodiment of the parser uses the following empirically-derived hierarchy-building borders:

When the 2-P procedure inserts], hierarchy-building builds weakly.

When the 2-P procedure inserts[ at "P-determiner," hierarchy-building is blocked by verbs.

When the 2-P procedure inserts[ at non-determiner P's, hierarchy-building is blocked by determiners and by all relations except]and[.

When the 2-P procedure inserts⌈ at "that P" with P unquantified (i.e., "that" used as a demonstrative adjective), there is no hierarchy-building.

An unanticipated consequence of picture-borders is that they allow sentences to have indirect objects. The sentence "He bought his wife a card" has 4 P's in a row. The rule listed above for hierarchy-building when the second P is a determiner gives:

(He) bought [(his)⌈ (wife)]⌈ (a (He) bought {[(his)⌈ (wife)]⌈ (a) ⌈ (card)]}.

Since properties and possession are similar, this cognitive form seems to say "(He) bought [(his wife) owner of (a card)]." That is, he has bought the situation of his wife owning a card. Since the picture is not precisely the one evoked by knowing the idiom ("he bought a card for his wife"), the sentence constitutes "picture slang." Since the 2-P procedure can only contribute] or⌈, it is noteworthy that sentences with indirect objects seem to be about property.

Parallel-Track Procedures

In statements, the verb asserts that the clause is true. Picture hierarchies can be built from pairs of such statements, as in "(The squirrel buried a nut) because (it was Fall)." In these situations, the parser uses a higher relation, a comma, or a relative pronoun as a signal to switch from building a (P V P) picture on one processing track to building a second (P V P) picture on another processing track.

[(The squirrel) buried (a nut)]
because
[(it) was (Fall)].

Each parallel track, which we will term a "sidetrack," is picture-grouped separately. At the end of the sentence, the two thoughts are joined by rejoining the sidetracks: {[(The squirrel) buried (a nut)] because [(it) was (Fall)]}. Without this track-switching, the hierarchy-building procedures presented thus far often give an incorrect parse: {[(The squirrel) buried (a nut)] because (it)} was . . .

Similarly, the parser uses commas as signals for parsing successive sentences joined by an inter-sentence relation. In "Therefore, John drank water" the comma initiates a sidetrack loosely associated with the main track:

[( ) Therefore ( )]
associated-with
[(John) drank (water)].

The comma is a relation, contributing a ")" at the end of the first track and a "(" before the sidetrack; it also initiates hierarchy-building of the main track. The hierarchy-building borders for this comma are any relation except] and⌈. The parser could now substitute the entire bottom picture into the top picture, giving:

{( ) Therefore [(John) drank (water)]}.

Finally, since "therefore" is an inter-sentence relation, the ( ) before it is a place for substituting the previous sentence.

The alternative sentence "John, therefore, drank water" gives the same result despite the interruption of the sentence by the inter-sentence relation. The parser uses the second comma (followed by a verb) as an indication to hierarchy-build the sidetrack and return to the main track.

These procedures also result in correct parsing of quotations. In a quotation, one statement is nested inside another:

[(The best alloy) uses (nickel)]
associated-with
[(he) said ( )].

The same procedures result in correct parsing of nonessential relative clauses, as in "The man, who wrote Waverley, drank port." The commas initiate a sidetrack, preventing "man" and "who" from being adjacent and thus preventing the 2-P procedure from being triggered inappropriately:

{[(The)⌈(man)] drank [port]}
associated-with
{[who] wrote [*Waverley*]}

"Who" can be replaced by the picture preceding it if desired; here, the previous picture is "the man." Since there is no ( ) to fill in, the two statements remain separate.

Truth value or pragmatic value phrases ("in fact," "fortunately") are parsed by the same procedures, even though their statement nature is only implicit ("'x' is fortunate"). Introductory phrases are also correctly parsed by these procedures, though only one statement is involved, and circumvent a hierarchy-building conflict. For example, the sentence "He planned the intermission between shows" can have a different meaning from "Between shows, he planned the intermission." To parse the second picture, the phrase after the comma is put on a sidetrack:

[Between (shows)]
associated-with
[(he) planned (the intermission)].

Once parsing is complete, the bottom picture can be substituted into the ( ) of the top picture to give a parse with an unambiguous meaning.

Clauses that are not asserted to be true—"embedded sentences"—are parsed using a second category of parallel track which will be termed a "subtrack". These are initiated by: a) a relative pronoun (creating an essential clause) or b) a class of verbs that can be followed by a second action. The latter—such as "make," "want," "know," and "is"—express causation, volition, emotion, or being rather than action, and will be termed "sentience verbs."

In "The man who wrote *Waverley* drank port", for example, the combination "man who" triggers the 2-P procedure. The relation inserted is ], since "man" is more specific than the pronoun: (The)⌈(man)] (who. Hierarchy-building at such relative pronoun 2-P insertions is blocked by a verb or a "the" that is not already part of a picture.

The relative pronoun "who" then initiates a subtrack connected to the main track by the inserted]. There is no hierarchy-building:

(The)⌈(man)]
(who

Parsing continues on the subtrack:

(The)⌈(man)]
[(who) wrote (*Waverley*)] drank (

A track can contain only one thought, so the second verb "drank" signals a return to the main track and initiates hierarchy-building as a verb:

(The)⌈(man)][(who) wrote (*Waverley*)] drank (
{(The)⌈<(man)][(who) wrote (*Waverley*)]>} drank ( This rejoining behavior differs from that of a sidetrack. If desired, "who" could have been replaced by the picture previous to it, "man":

{[(The)⌈(man)][(man) wrote (*Waverley*)]]] drank (port)}.

This parse is the correct cognitive form, because the man is being defined by his participation in the activity of writing *Waverley*. For this reason, the scope of "the" is the entire clause "man who wrote *Waverley*."

Sentience verbs are simpler, since they hierarchy-build completely when starting the subtrack:

(I)
know
{(you) read [(the)⌈(book)]}.

An unanticipated consequence of the subtrack procedures is that they permit parsing of word inversions that put the object of an action in the subject position. In "He drove the bus that we painted," the phrase "bus that we" initiates subtracks both before and after "that":

(He) drove (the)[(bus)]
(that)]
[(we) painted ( )].

The pronoun "that" can be substituted by the previous picture, "bus," and the lowest subtrack rejoined to the second subtrack:

(He) drove (the)[(bus)]
[(bus)][(we) painted ( )]].

A semantic or conceptual analyzer can now substitute "bus" into the "( )". After rejoining subtracks, the parse is:

(He) drove (the)[(bus)][[(we) painted ((bus))]].
(He) drove (the)[{(bus)][[(we) painted ((bus))]]}.

The cognitive form now makes it apparent that the bus has been defined as the one that is a part of the action "we painted bus". Hierarchy-building can then be continued to completion.

Distinctions from Prior Approaches to Sentence Parsing

Many differences are apparent between the procedures used by a cognitive parser of the present invention and those used in the prior art. Cognitive parsers are distinct from syntactic, semantic, and conceptual parsers because the final result is in cognitive form (a tree of symbols for pictures and symbols for relations) rather than: a head-and-modifier structure (such as a diagrammed sentence), a tree of syntactic categories, a tree of semantic categories, a network of semantic primitives, or a network of conceptual primitives or dependencies. Cognitive parsers are further distinguished from syntactic, semantic, and conceptual parsers in using symbols for relations to initiate parsing procedures, to determine the applicable rule for selecting the start- and stop-sites of a parsing procedure, and as the actual start- and stop-sites for a parsing procedure. Cognitive parsers are further distinguished from prior art parsers in not employing backtracking or parsing-in-parallel to process multiple alternative partial-parses.

Cognitive parsers are additionally distinct from syntactic parsers because: they do not use information about the lexical category of a word or the syntactic category of a phrase; they do not use information about agreement in number, gender, case, or tense; they do not distinguish between different nouns, unless a relation has been omitted; and most cognitive parsing operations do not distinguish between nouns and pronouns, adjectives and articles, or verbs and prepositions. Cognitive parsers are further distinguished from syntactic parsers in not identifying functional roles of words and phrases, such as subjects and predicates or agents and objects. Cognitive parsers are additionally distinguished from syntactic parsers in inserting words and symbols not present in the original sentence. Cognitive parsers are distinct from most prior-art syntactic parsers because they parse in a bottom-up manner.

Cognitive parsers are additionally distinct from pattern-matching or transition-network syntactic parsers, since they construct a hierarchical parse. They are distinct from recursive transition networks in using nesting rather than loops, so that, for example, multiple adjectives are nested rather than concatenated. Cognitive parsers are distinct from immediate-constituent syntactic parsers in using a single immediate-constituent rule (for English, P rel P→P) for multiple levels of a hierarchical parse.

Cognitive parsers are distinct from transformational-grammar parsers, since they do not perform word-order transformations. They are distinct from phrase structure grammar parsers, since they do not use derived syntactic categories to leave gaps for subsequent long-distance dependencies. Cognitive parsers are distinct from augmented transition networks, since they do not use tables of word features and roles. They are distinct from tree-adjoining-grammar parsers in not beginning with a set of preconstructed syntactic trees. They are distinct from Marcus-type deterministic syntactic parsers in not constructing a tree of syntactic categories. Cognitive parsers are distinct from parsers that use tables of word co-occurrence frequencies in that they do not rely on such tables.

Cognitive parsers are additionally distinct from syntactic parsers supplemented by semantic interpretation because they do not use pre-constructed semantic networks, set membership hierarchies, or word-based selection-restriction rules. Indeed, they are insensitive to most semantic information: they do not distinguish between "The squirrel buried a nut" and "My aunts sent a telegram," and they allow "Colorless green ideas sleep furiously." For the same reason, cognitive parsers are distinct from devices that construct predicate-argument structures. Cognitive parsers are further distinguished from many prior-art semantic interpretation parsers in being generative rather than matching template-patterns for semantic case, mood, transitivity, theme, information, or voice. Cognitive parsers do not build parsed structures by assembling overlapping parse fragments.

Cognitive parsers are distinct from semantic parsers because they are insensitive to most semantic information; as noted above, they do not distinguish between "The squirrel buried a nut" and "My aunts sent a telegram." Cognitive parsers are additionally distinct from semantic parsers because they are not limited to parsing words; sequences of icons or sign language configurations can also be parsed.

Cognitive parsers are distinct from conceptual analyzers because of their insensitivity to most semantic information. They are additionally distinct from conceptual analyzers because they preserve word order. Cognitive parsers furthermore do not use pre-constructed templates for commonly-encountered messages; conceptual selection-restriction rules; or conceptual case structures. They also do not seek key words on which to base slot-filler structures.

The procedures that the cognitive parser of the present invention uses generate several novel results unanticipated from the prior art. Certain word combinations automatically leave gaps at sites of long-distance dependencies, which a semantic or conceptual analyzer can fill in. At some word combinations, the cognitive parser inserts words or symbols for missing relations. Disambiguation is avoidable for a large fraction of cognitive parsing; for many symbolic expressions, disambiguation in fact occurs as a side-product of parsing. Cognitive parsing entails a novel class of rules (hierarchy-building and picture-border procedures) which govern the parser's grouping of newly-built structures. The resulting cognitive forms differ from standard grammar representations of sentences; for example, multiple adjectives are nested rather than concatenated, and adverb phrases are related to entire preceding statement rather than modifying just the verb. Related syntactic structures—such as passive voice, perfect tense, and indirect object phrasings—become parsed in a way showing that they are conceptually different rather than just syntactically rearranged. In the illustrative embodiment, a parser for English sentences, processing time varies linearly with respect to sentence length.

DETAILED DESCRIPTION OF THE INVENTION

Figure 1:
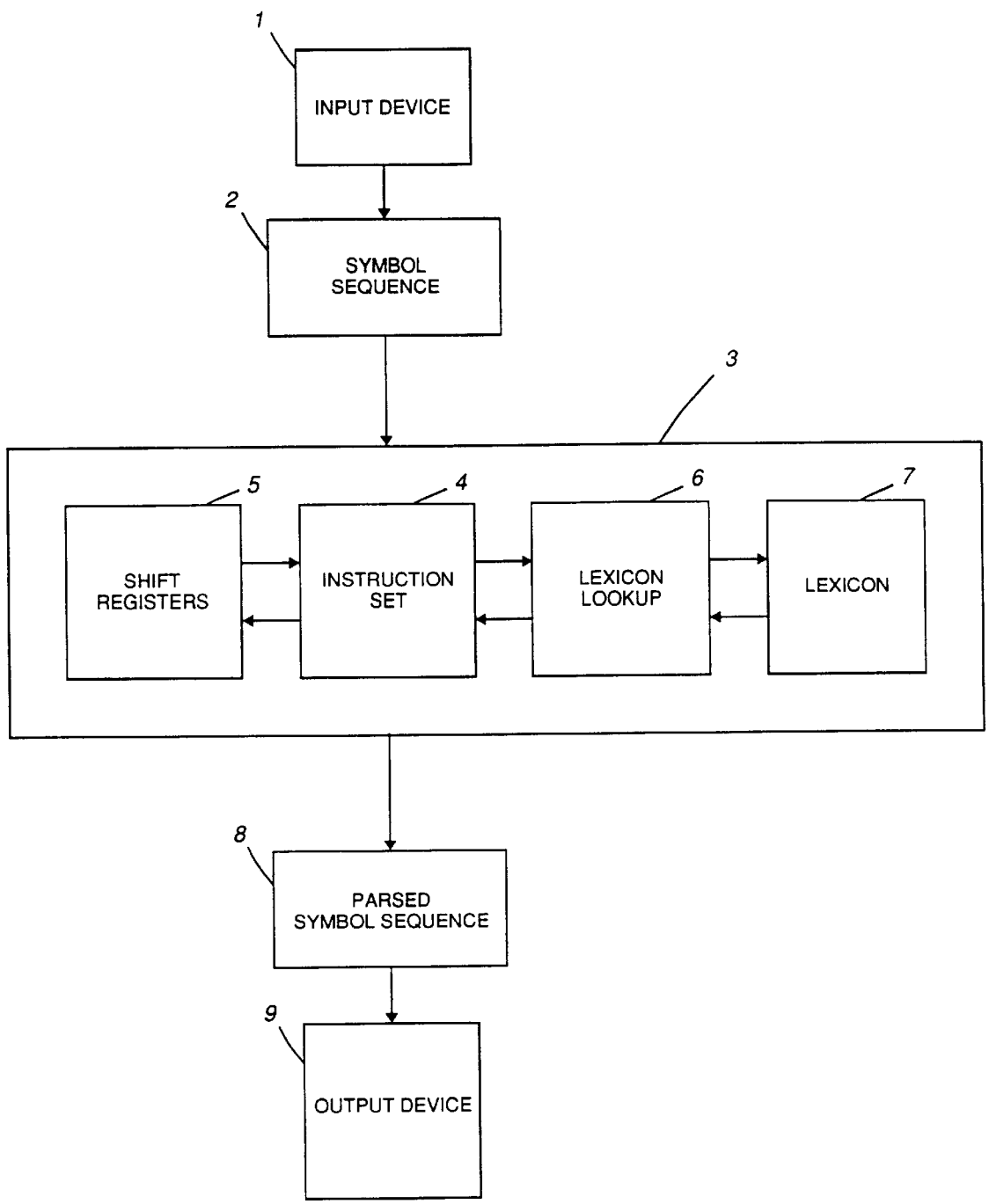
FIG. 1 shows the overall structure of an illustrative embodiment of a cognitive parser, a cognitive parser for English sentences.

FIG. 1 shows the overall structure of a cognitive parser for parsing symbol sequences. The cognitive parser includes an input device 1, such as a keyboard, for inputting a sentence or other symbol sequence 2, a computing device 3 which includes a microprocessor executing an instruction set 4 (also referred to herein as "parsing procedure") for sentence-processing steps, memory, preferably an array of shift registers 5 within which words or symbols are placed and moved as the sentence is parsed, a lexicon look-up function 6 for seeking information from a lexicon 7, preferably stored in memory.

The cognitive parser of the present invention also includes an output device 9, such as a display screen, for outputting the parsed sentence or other parsed symbol sequence 8. It should be apparent to those skilled in the art that input and output devices 1 & 9 can also be devices such as a voice-recognition system, devices for electronic transfer of text, or a printer. Entries of the lexicon 7 contain: the words or other symbols (which, for simplicity, will be referred to as "words" in the following); notation whether the word represents a picture, a relation, or a picture accompanied by a relation (the entity-type); notation of the word's position on a continuum between sensory-related and abstract; and auxiliary information about the word's hierarchy-building properties and parallel-track utilization.

The operation of the instruction set 4 and the array of shift registers 5 will be described in greater detail hereinfollowing.

Figure 2:
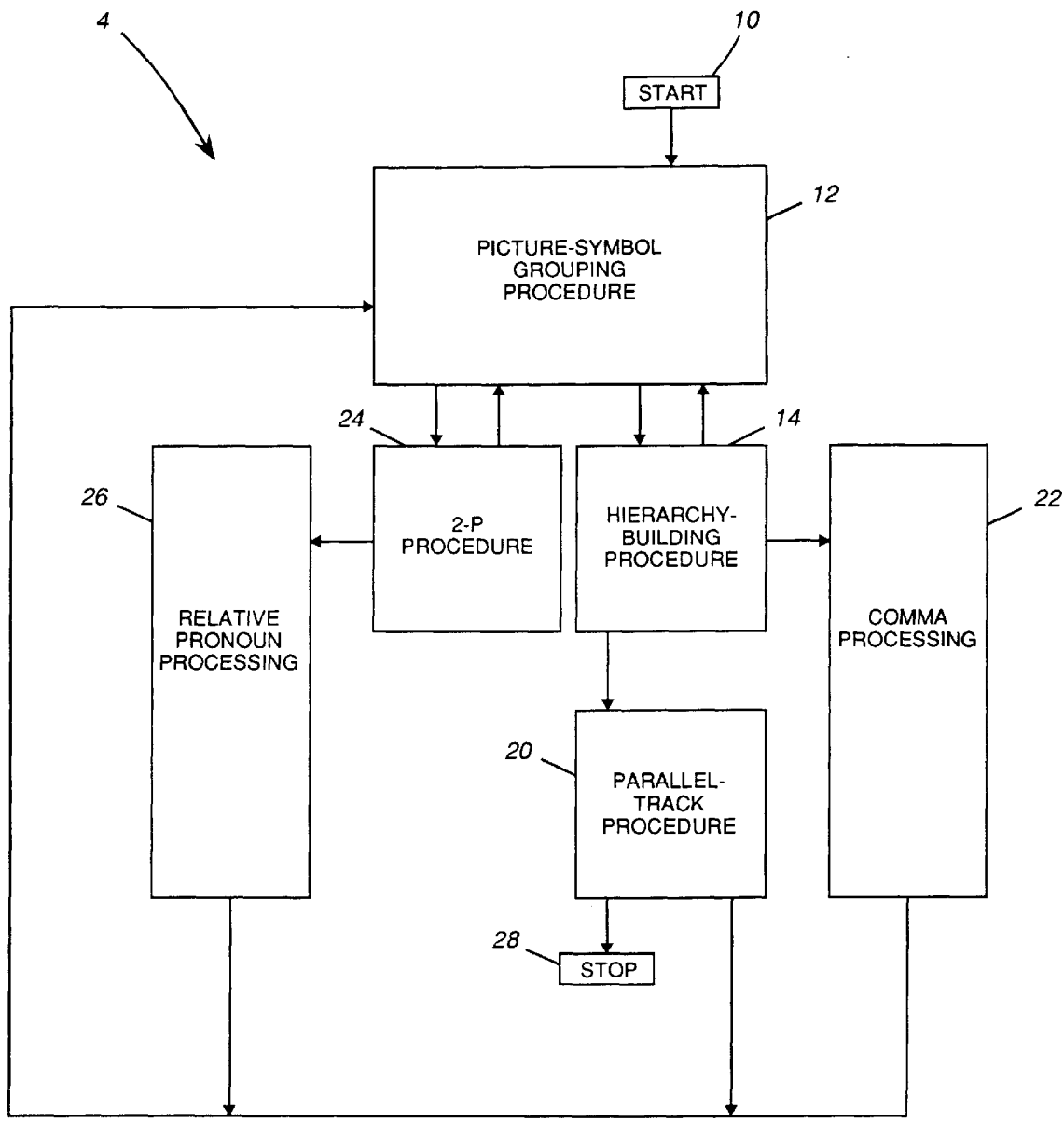
FIG. 2 shows a flowchart of the instruction set of the cognitive parser of FIG. 1, which manipulates symbols in the computing element workspace during cognitive parsing.

FIG. 2 shows the symbol processing steps of the instruction set 4. A START module 10 sets up initial parameters, such as declaring and initializing variables, inserting spaces to separate punctuation from letters, reading a user's choice of screen display options, and defining the array of shift registers 5. A picture-grouping procedure 12 reads one word of the sentence I and looks it up in the lexicon 7. Subsequent processing of each word follows one of the possible paths (arrows and procedure boxes) from the picture-grouping procedure 12 to a STOP module 28, or back to the picture-grouping procedure 12 whereupon the next word is read. The particular path followed depends on decisions made within each procedure module, as described in detail in subsequent Figures.

After a word has been read and looked up in the lexicon 7, a decision step in the picture-grouping procedure 12 notes whether the newly-read word denotes a picture or a relation. If the word is a picture-word, it is placed into the shift register 5 in an unfilled picture-position of an alternating pattern of "picture-word/relation-word/picture-word/relation-word . . . . " Fitting this pattern may require that a gap be left. A second decision step determines whether the previous word was also a picture. If not, the next word is read. If so, control passes to a 2-P procedure 24, which usually inserts the missing relation and returns control to the picture-grouping procedure 12, where the next word is read. If, however, one of the two successive P-words can be a relative pronoun, control passes to a relative pronoun processing procedure 26 for insertion of the missing relation. After the missing relation is inserted, control returns to the picture-grouping procedure 12, where the next word is read.

If the decision step in the picture-grouping procedure 12 notes that the newly-read word denotes a relation, it is placed into the shift register 5 in an unfilled relation-position of the alternating "picture-word/relation-word/picture-word/relation-word . . . " pattern. The picture-grouping procedure 12 then uses the newly placed relation-word to mark a boundary between picture-words, thereby parsing the sentence 1 into pictures and relations. For example, if parentheses are used, the result is (P) rel (P) rel (P) . . . .

After a relation-word has been read and the boundary marked, control passes to a hierarchy-building procedure 14. This procedure examines the current and preceding parsed structures to find a (P) rel (P) sequence. If found, the sequence is marked to build a ((P) rel (P)) picture-symbol group. Another decision step then determines whether the newly-read relation was one of several special relations, to be described hereinafter. If not, control returns to the picture-grouping procedure 12, where the next word is read. If so, control passes to a parallel-track procedure 20. Here, the parser begins utilizing a new workspace in the register 5 (a sidetrack 36 or a subtrack 38; see FIG. 3), or terminates use of a subtrack or a sidetrack and returns to utilizing the original one (the main track 30). Control then passes to the picture-grouping procedure 12, where the next word is read.

If the special relation is a comma, control passes from the hierarchy-building procedure 14 to a comma processing procedure 22, which has its own hierarchy-building, subtrack, and sidetrack procedures. Control then returns to the picture-grouping procedure 12, where the next word is read. If the special relation is a period, the hierarchy-building procedure 14 reiterates as many times as possible, the parallel-track procedure 20 rejoins all sidetracks and subtracks to the original track, and control passes to a STOP module 28. The STOP module puts the parsed sentence 8 into a readily readable format, displays it on the output device 9, and halts processing.

Figure 3:
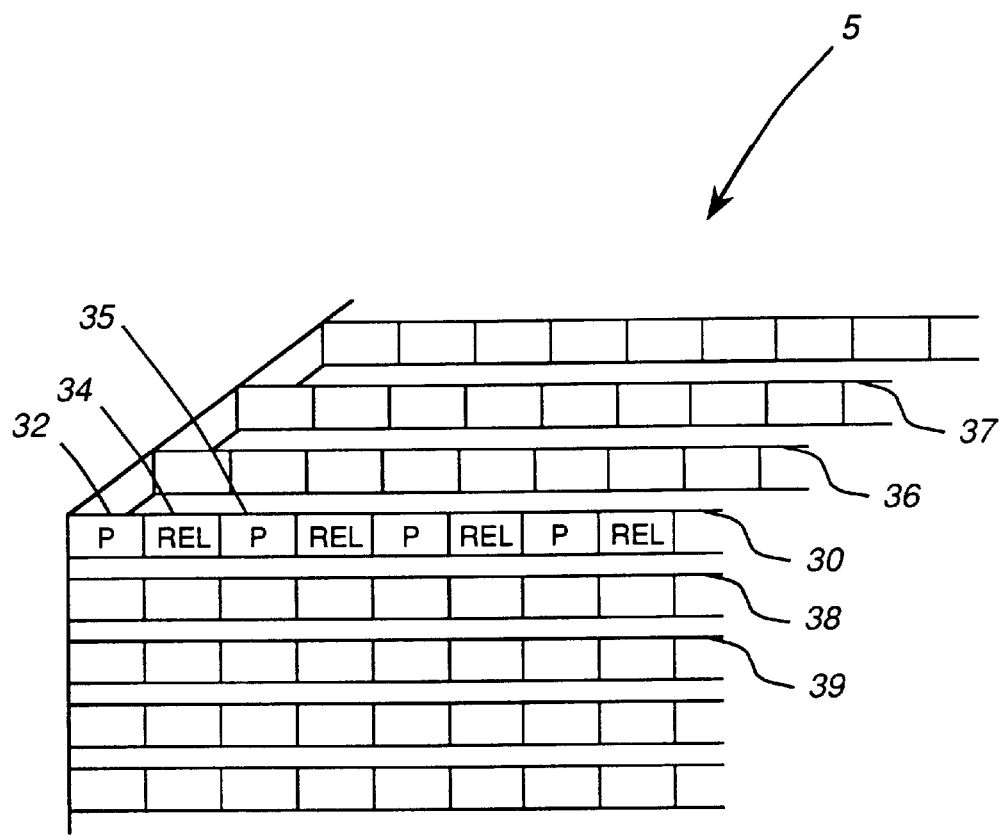
FIG. 3 shows the structure of the shift-registers for words used by the cognitive parser of FIG. 1, the contents of which are manipulated during cognitive parsing in the illustrative embodiment.

FIG. 3 shows the structure of the shift-register for words 5. Each 1-dimensional portion of the shift-register will be referred to as a "track"; most processing occurs on the main track 30. Each track is divided into alternating compartments, termed P-boxes 32 & 35 and rel-boxes 34. The cognitive parser places the first picture-denoting word of the sentence 1 into the left-most P-box 32 of the main track 30; the first relation-word into the left-most rel-box 34; the second P-word into the second P-box 35; and so forth. Tracks adjacent to the main track 30 are termed sidetracks 36 & 37; tracks below the main track are termed subtracks 38 & 39. Subtracks can have sidetracks and vice versa, so the entire 3-D array is filled with tracks. Certain relation-words, as will be described hereinafter, initiate a shift in track usage so that, for example, after partially filling the main track 30 the cognitive parser begins placing the remaining words of a sentence 1 on subtracks 38 and 39.

Figure 4:
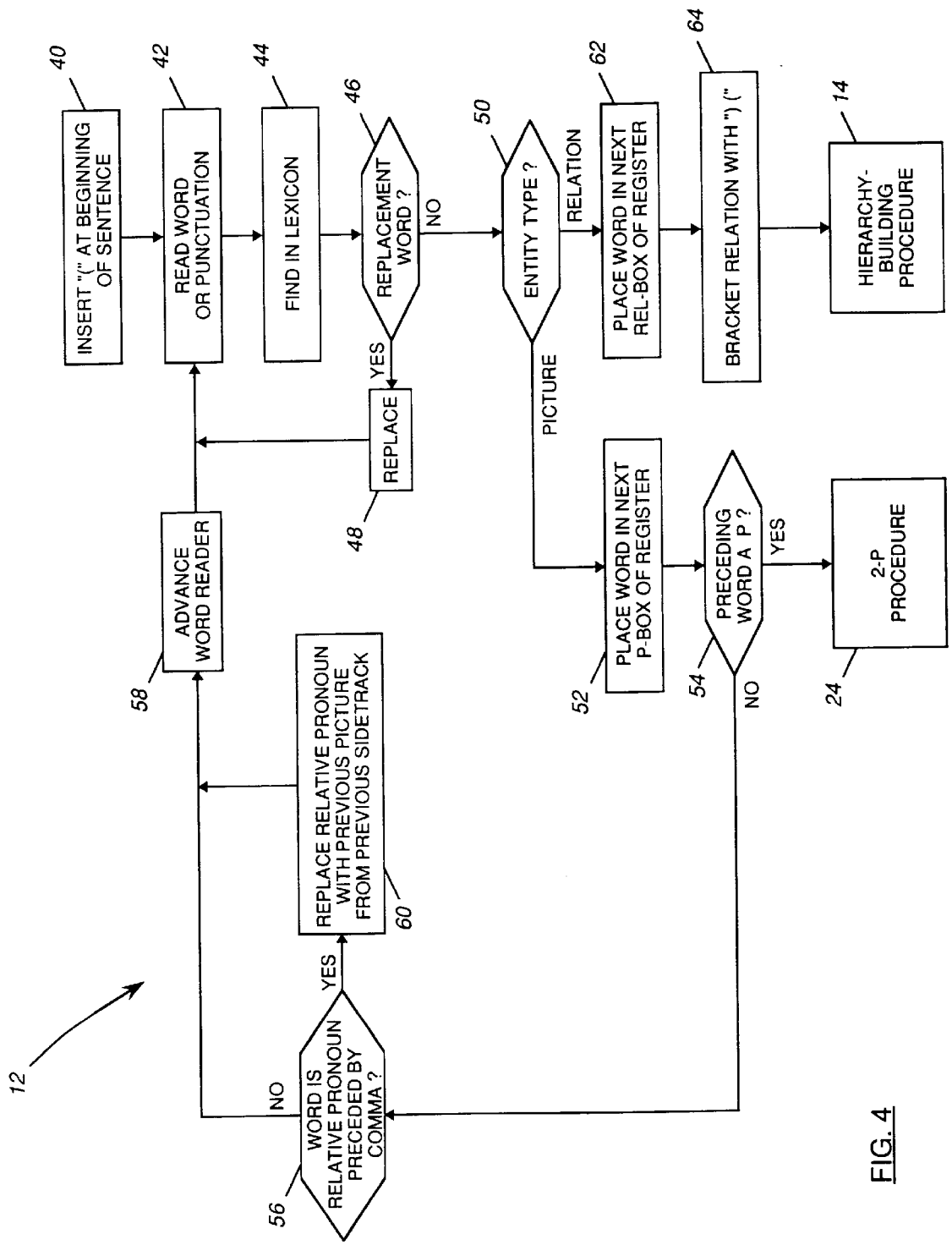
FIG. 4 shows a flowchart of the picture-symbol grouping procedure of the FIG. 2 instruction set, the core operation in cognitive parsing.

FIG. 4 shows the detailed structure of the picture-symbol grouping procedure 12 of FIG. 2. For clarity, sentence-processing is described in terms of operations on the shift-register for words 5, but other methods of grouping symbols and inserting missing relations could be used. The picture-symbol grouping procedure 12 begins at step 40 by placing a "(" into the first P-box 32. At step 42, the first word or punctuation symbol of the sentence 2 is read. Step 44 accesses the lexicon lookup procedure 6, which then looks up this word or punctuation symbol in the lexicon 7. If step 46 determines that the lexicon has marked the word as being better processed after being replaced by other words, as for an adjective denoting a picture plus a relation, then step 48 replaces the original word by its replacement(s) from the lexicon and step 42 re-reads it.

At step 50, the parser reads the word's entity-type entry in the lexicon 7. If the entity-type is "picture," step 52 copies the word in the first P-box 32 of the main track 30. It also notes the current P-box's location in a variable such as "lastploc." If step 50 finds that the word's entity-type is "relation," step 62 then copies the word in the first rel-box 34. The current rel-box's location is noted in a variable such as "lastrloc." If step 50 finds that the word can be either a picture or a relation, the word is copied into the left-most box of either type that does not yet contain a word. That is, the parser acts as if the newly-read word is of the type required to fit an unbroken (P) rel (P) rel (P) . . . pattern.

Figure 9:
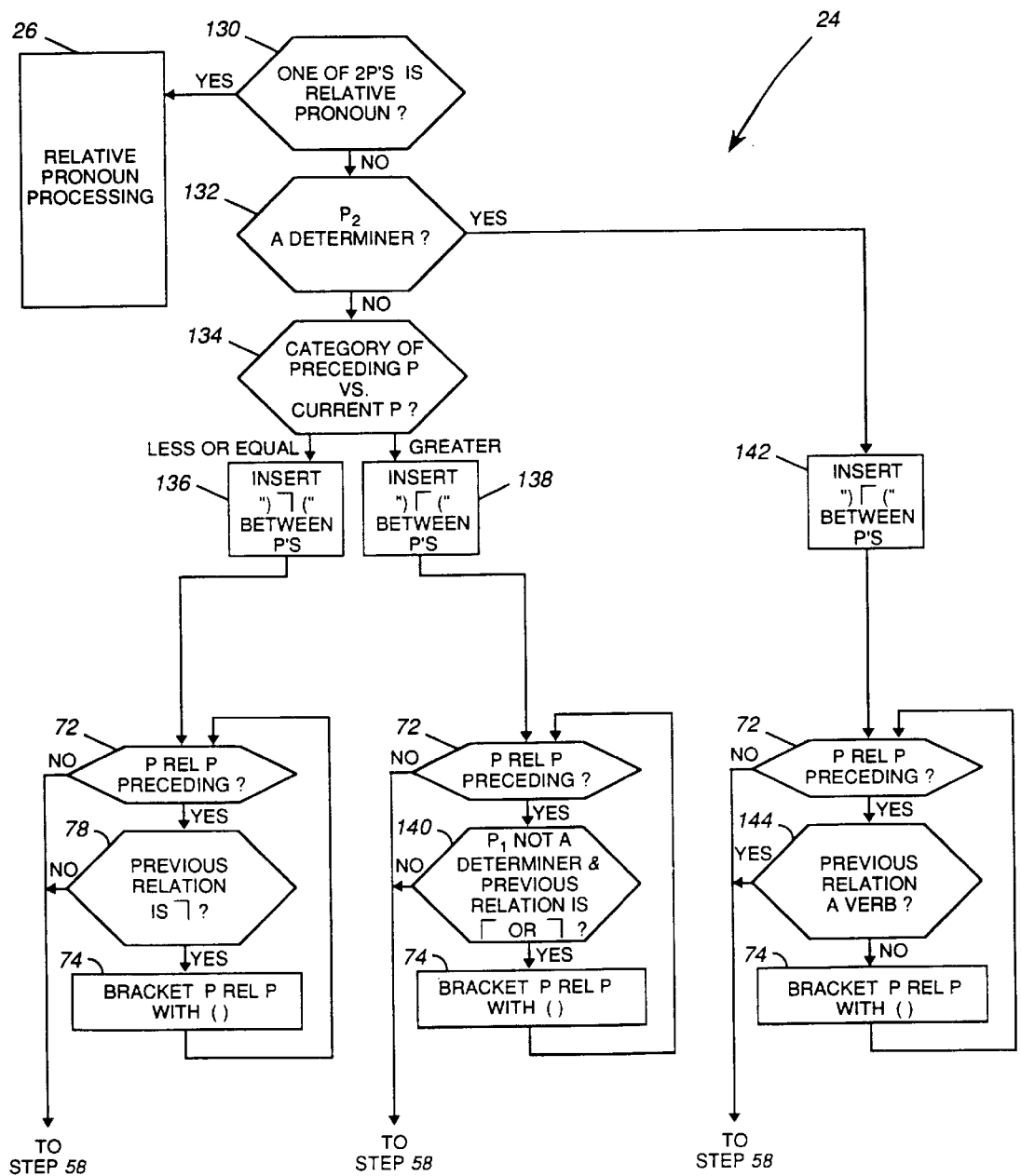
FIG. 9 shows a flowchart of the 2-P procedure of the FIG. 2 instruction set, in which the presence of two successive words for pictures initiates one of several processing pathways.

Step 54 determines whether the word preceding a newly-read P-word was another P. If not, then step 56 determines whether the word is a relative pronoun preceded by a comma. If not, then step 58 advances the word reader to the next word or symbol in the sentence 2. If so, step 60 retains the relative pronoun's referent by replacing the relative pronoun with the previous picture constructed by the cognitive parser. If step 54 finds that the word preceding a P-word was also a P-word, control passes to the 2-P stage (24 of FIG. 2; FIG. 9).

Figure 5:
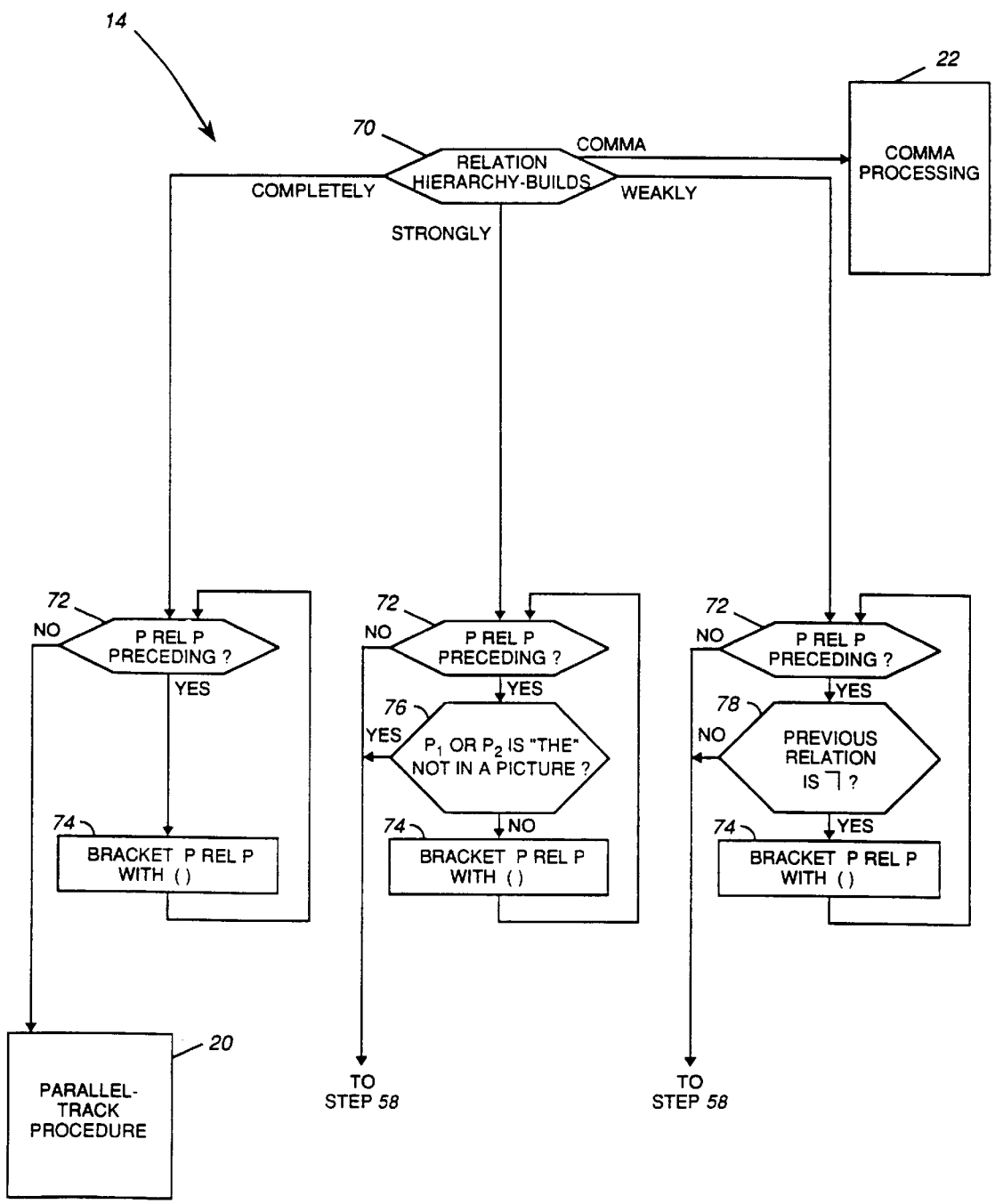
FIG. 5 shows a flowchart of the hierarchy-building procedure of the FIG. 2 instruction set, in which low-level pictures are combined into higher-level ones.

The core function of the picture-grouping stage 12 occurs after step 62 has copied the newly-read relation-word into a rel-box. Step 64 then puts a ")" after the P-word in the P-box 32 that lies to the left of the current rel-box 34. This step also places a "(" in the empty P-box 35 that lies to the right of the current rel-box 34. The words up to and including the current word have now been parsed into pictures and relations. Control then passes to the hierarchy-building stage (14 of FIG. 2; FIG. 5).

Each remaining word of the sentence 2 is processed similarly, but with step 52 copying P-words into the left-most P-box not already containing a word and step 62 copying rel-words into the left-rel P-box not already containing a word.

Figure 8:
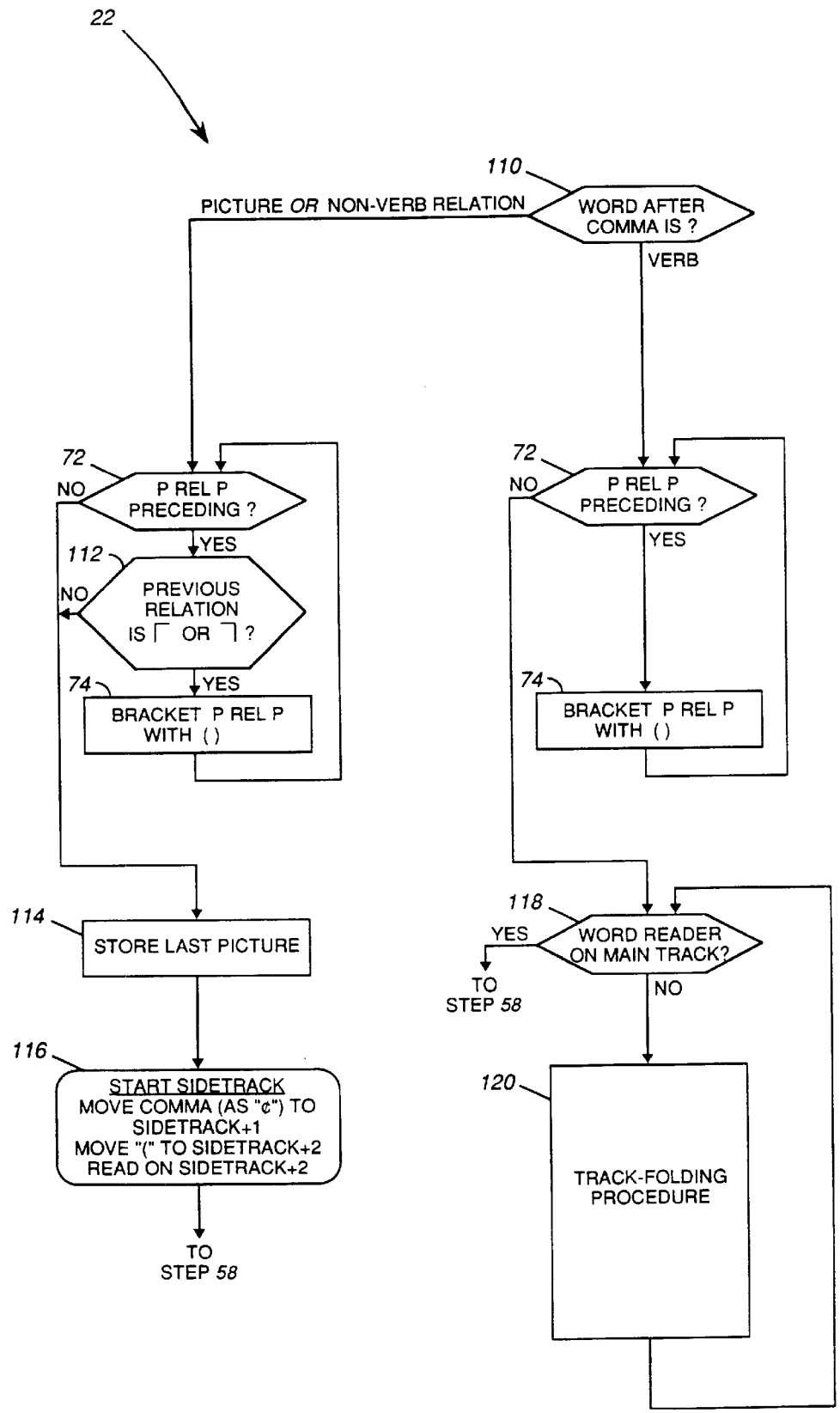
FIG. 8 shows a flowchart of the comma processing procedure of the FIG. 2 instruction set, in which a comma initiates one of several processing pathways.

FIG. 5 shows the detailed structure of the hierarchy-building procedure 14. Step 70 looks up the current relation-word's lexicon entry, to determine whether the word hierarchy-builds completely (periods, verbs, higher relations, path prepositions), strongly (most prepositions), or weakly (binding prepositions such as "of"), or is a comma. Each hierarchy-building property results in control being passed to a different one of three hierarchy-building modules, 72 & 74 or 72-76-74 or 72-78-74. If step 70 determines that a complete builder is a verb, it also adds 1 to a variable such as "vbct" for later use. If step 70 determines that the relation is a comma, control passes to the comma processing procedure (22 of FIG. 2; FIG. 8).

Hierarchy-building modules appear at many locations in the cognitive parser, and have three parts. First, step 72 determines whether the shift register 5 contains to the left of the current relation-word: a P-word, a previous relation-word, and another P-word. If not, control returns to step 58 of the picture-grouping procedure 12, where the next word is read. Second, if the shift register 5 does contain a P-word, relation-word, and another P-word to the left of the current relation-word, the parser then tests for the presence of a word that acts as a picture-boundary 76 & 78. This picture-boundary condition determines where leftward hierarchy-building stops, and varies from one module to the next as seen by comparing steps 76 and 78. For complete-builder relations 72 & 74, there is no test for a picture boundary because hierarchy-building goes to completion. For strong builders, step 76 of the parser tests for a "(the)" not already incorporated into a larger (P rel P). For weak builders, step 78 tests whether the previous relation is a relation other than "]". If a picture-boundary is found, control returns to step 58 of the picture-grouping procedure 12 where the next word is read. Third, if step 76 or step 78 determines that no picture-boundary is present, then step 74 brackets the P rel P with parentheses to give (P rel P).

It should be apparent to those skilled in the art that many methods of bracketing can be envisioned other than those described herein. In the preferred embodiment, bracketing is achieved by i) shifting the previous relation-word (e.g. the one in rel-box 34) and second P (e.g. the one in P-box 35) into the P-box containing the first P (e.g. P-box 32) and ii) placing a "(" and ")" at the left and right ends, respectively, of that P-box (e.g. P-box 32). The current relation is then also shifted leftward to the rel-box formerly occupied by the previous relation (e.g. rel-box 34). These operations are described in detail in the section on the operation of the cognitive parser, FIGS. 11 and 12.

Figure 6:
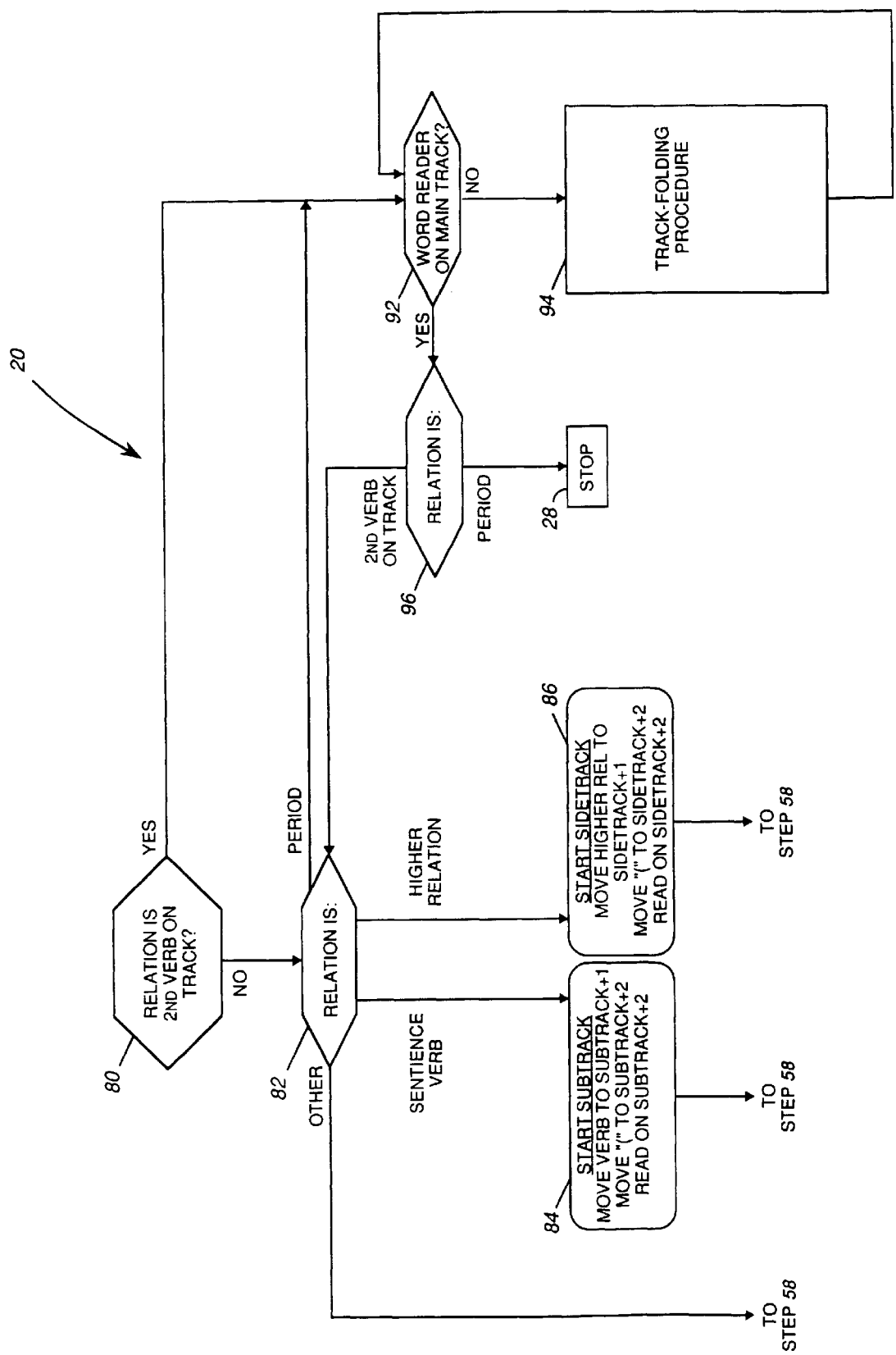
FIG. 6 shows a flowchart of the parallel-track procedure of the FIG. 2 instruction set, in which control passes to additional word shift-registers.

After thus hierarchy-building once, the parser loops from step 74 back to step 72 to find additional sets of P, rel, and P to the left of the current relation-word. For complete builders, this loop continues until the beginning of the sentence 2 is reached; in addition, step 72 passes control to the parallel-track procedure (20 of FIG. 2; FIG. 6).

FIG. 6 shows the detailed structure of the parallel-track procedure 20. The cognitive parser reaches this point after hierarchy-building for a complete-builder relation. Step 80 then tests whether this relation is the second verb on the current track, because such verbs are signals for ending tracks. If not, step 82 tests whether the relation is a sentience verb, higher relation, or period by looking up the word in the lexicon 7. If none of these is the case, control returns to step 58 of the picture-grouping procedure 12 where the next word is read.

If step 82 finds the relation to be a sentience verb, step 84 initiates two new subtracks for processing the remainder of the sentence. If processing is currently occurring on the main track 30, these subtracks are 38 & 39 (FIG. 3). In general, in the illustrative embodiment, the sentience verb is moved to the first rel-box of the next subtrack down (current subtrack+1); next the sentience verb's "(" is moved to the first P-box of the second subtrack down (current subtrack+2). Details are given in the description of FIG. 12. Control then returns to step 58 of the picture-grouping procedure 12 where the next word is read, so that the remaining words of the sentence 1 are processed on the subtrack+2. The sentience verb on subtrack+1 connects the main track 30 to subtrack+2.

Similarly, if step 82 finds the relation to be a higher relation, step 86 initiates two new sidetracks such as 36 & 37. The higher relation is moved to the first rel-box of the next sidetrack over (current sidetrack+1); then the higher relation's "(" is moved to the first P-box of the second sidetrack over (current sidetrack+2). Details are given in the description of FIG. 11. Control then returns to step 58 of the picture-grouping procedure 12 where the next word is read, so that the remaining words of the sentence are processed into sidetrack+2. The higher relation on sidetrack+1 connects the main track 30 to sidetrack+2.

If step 82 finds the relation to be a period, step 92 determines whether processing is occurring on the main track 30. If not, processing on the subtrack or sidetrack will end and that track will be rejoined to the previous track by a track-folding procedure (94 and FIG. 7). Since multiple layers of tracks can have been created during processing, track rejoining repeats until step 92 finds that the main track 30 has been reached. Control then passes to step 96, which determines whether this point was reached because the current relation is a period, as just discussed, or because it was the second verb on a track (discussed next). If a period, control passes to a STOP module 28 which prepares the now completely parsed sentence 9 for an output device 8.

Step 80 can find that the current relation-word is the second verb on the current track, a signal to end that track. Step 92 then determines whether processing is occurring on the main track 30. If not, processing on the subtrack or sidetrack will end and that track will be rejoined to the previous track by the track-folding procedure (94 and FIG. 7). Track rejoining repeats until step 92 finds that the main track 30 has been reached. Control then passes to step 96, which determines whether this point was reached because the current relation was the second verb on a track, or because it was a period. If the relation was the second verb on a track, control passes to step 82.

Figure 7:
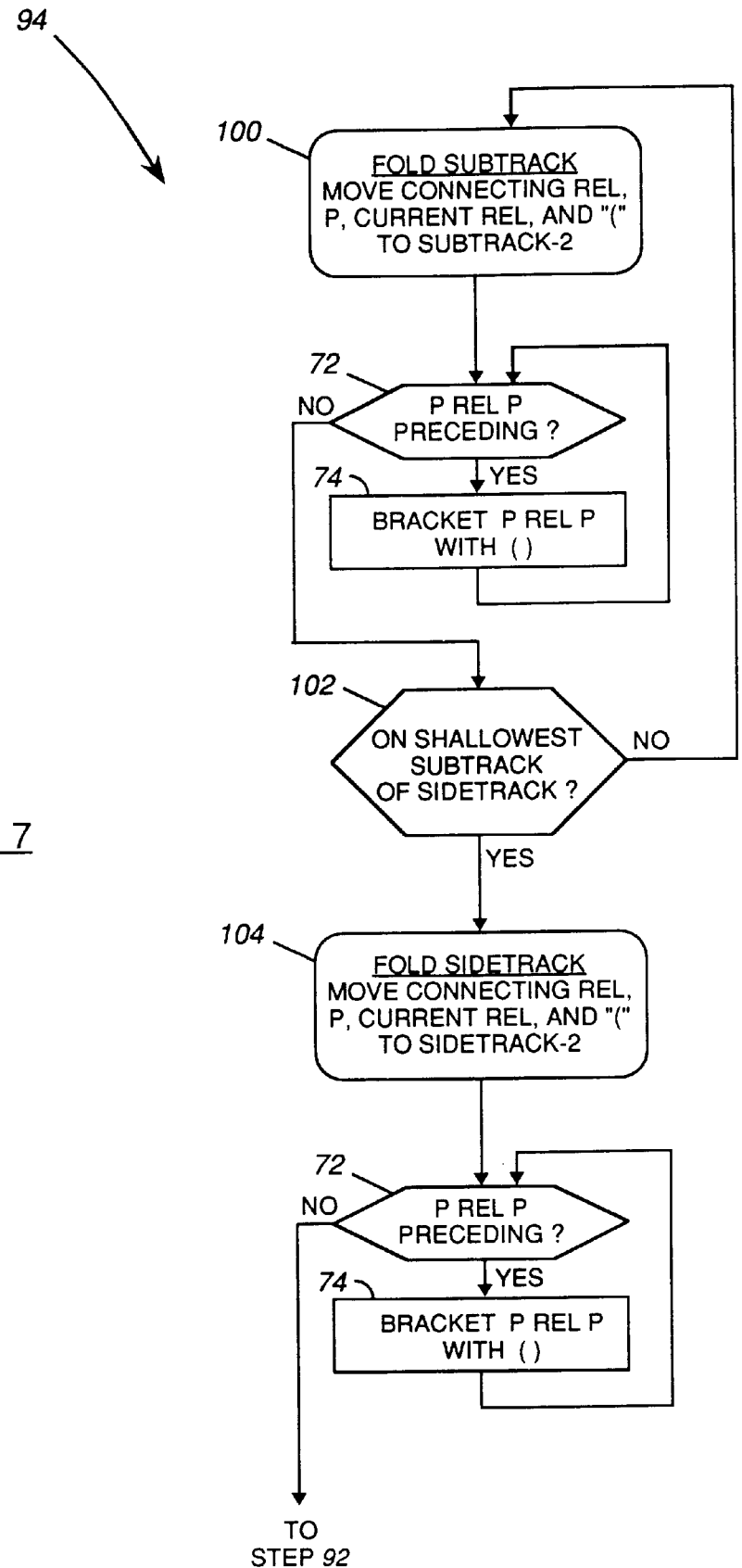
FIG. 7 shows a flowchart of the track-folding step of the FIG. 6 parallel-track procedure, in which the contents of the additional word shift-registers are combined back into the main shift-register.

FIG. 7 shows the detailed structure of the track-folding procedure, step 94 of FIG. 6. First, step 100 rejoins the current subtrack to the next-shallowest subtrack by moving the following items to the lowest available rel and P boxes of the next-shallowest subtrack: The connecting relation (the relation that created the subtrack, either a sentience verb, as discussed with FIG. 6, or a] relation, to be discussed hereinafter); the subtrack's P; the current relation (the relation initiating track-folding); and the "(" inserted by that relation. Details are given in the description of FIG. 12. A hierarchy-building module 72 & 74 then hierarchy-builds completely. Step 102 tests whether processing is now on the shallowest subtrack of the current sidetrack. If not, processing returns to step 100 and the operations repeat until step 102 finds that all subtracks have been rejoined to the sidetrack.

Step 104 then rejoins the sidetrack to its next-shallowest sidetrack by similar operations. The following items are moved to the first available rel and P boxes of the next-shallowest sidetrack: The sidetrack's connecting relation (the higher relation that created the sidetrack); the sidetrack's P; the current relation (the relation initiating track-folding); and the "(" inserted by that relation. Details are given in the description of FIG. 11. Another hierarchy-building module 72 & 74 then hierarchy-builds completely.

Control then returns to step 92 (FIG. 6) in order to determine whether the main track 30 has now been reached. If not, the subtrack and sidetrack rejoining procedures repeat, beginning with step 100, until step 92 (FIG. 6) determines that all tracks have been rejoined to the main track.

FIG. 8 shows the detailed structure of the comma processing procedure 22 of FIG. 2. The cognitive parser reaches this point after the hierarchy-building stage 14 has determined that the current relation is a comma. At step 110 the cognitive parser uses the lexicon 7 to determine the type of word following the comma.

If that word is a P or a relation that is not a verb, the parser assumes that the comma is an initial or middle comma for a list, parenthetical expression, or appositive. The parser therefore executes hierarchy-building steps 72-112-74 to build the pictures preceding the comma. Hierarchy-building continues as long as step 112, a picture-border test, determines that the relation preceding the comma is[ or]. When hierarchy-building stops, step 114 stores the assembled picture for later use by pronouns in step 162 of FIG. 10. Step 116 then initiates two new sidetracks for processing the remainder of the sentence. The comma is moved to the first rel-box of the next sidetrack over (current sidetrack+1; e.g. 36 if processing is currently on the main track 30). In the illustrative embodiment, the comma is then changed to a "cents" sign so that the parser can later distinguish it from other commas; this choice of replacement symbol is arbitrary. The comma's "(" is moved into the first P-box of the second sidetrack over (current sidetrack+2; e.g. 37). Control then returns to step 58 the picture-grouping procedure 12 where the next word is read, so that the remaining words of the sentence 2 are processed on the sidetrack+2. The comma on sidetrack+1 connects the previous track, e.g. 30, to sidetrack+2.

If step 110 instead determines that the word after the comma is a verb, the parser assumes that the comma is the final comma of a parenthetical expression or an appositive. As a result, it assumes that processing has been occurring on a sidetrack that should now be terminated. The parser therefore executes hierarchy-building steps 72 & 74 to completely build the pictures preceding the comma. When hierarchy-building is complete, step 118 tests whether processing is occurring on the main track 30; if not, a track-folding procedure 120 is initiated.

Procedure 120 is the same as track-folding procedure 94 (FIG. 7) for folding of subtracks, such as 38 & 39. However, there is no folding of sidetracks such as 36 & 37. Because parenthetical expressions and appositives are separate from a sentence's main thought, the parser leaves them in their sidetrack, e.g. 37, rather than being rejoined to a shallower sidetrack. Specifically, the connecting comma (the previous comma that initiated the sidetrack) and the P are not moved. The current comma and its "(" are deleted. The following verb and its "(" are placed in the first available rel- and P-boxes of the next-shallowest sidetrack. Track-folding repeats until step 118 determines that the main track 30 has been reached. Because the verb following the comma was entered into the register at step 110, step 118 also advances the word counter by one so that the next-word reader will skip a word. Control then returns to step 58 of the picture-grouping procedure 12 where the next word is read. The remaining words of the sentence 2 are processed into the main track 30.

FIG. 9 shows the detailed structure of the 2-P procedure 24. If the picture-grouping procedure 12 (FIG. 2) has determined that there have been two picture-words in a row, step 130 then uses the lexicon 7 to determine whether one of the picture-words is a relative pronoun. If so, control passes to the relative-pronoun processing procedure 26 (FIG. 2). If not, step 132 determines whether the second picture-word —the current word—is a determiner such as "a" or "the".

If the second picture-word is not a determiner, step 134 examines the lexicon 7 to determine each picture-word's cognitive category. These categories are pre-assigned a rank ranging from sensation-related to abstract concepts. Other similar lists could be derived either from a general principle or from empirical comparison to the resulting accuracy in parsing a particular language. The more specific or sensation-related of the two P's is parsed as a component of the other. Thus, if the first picture-word is more sensation-related (as in "red windmill"), step 136 inserts the symbols),], and (between the two picture-words, in the appropriate P- and rel-boxes of the register. The same relation is inserted if the two words have the same category ("dog house"). A hierarchy-building module 72-78-74 then assembles the pictures preceding the newly-inserted relation into larger pictures. Step 78 tests for a picture-border, ending hierarchy-building at the first relation other than ]. When step 72 determines that hierarchy-building is complete, control returns to step 58 of the picture-grouping procedure 12 where the next word is read.

If, instead, the second picture-word is more sensation-related than the first (as in "the windmill"), step 138 inserts the symbols),[, and (. Hierarchy-building module 72-140-74 follows, and step 140 allows hierarchy-building of pictures preceding the inserted relation only if the left-hand P—the P preceding the first of the 2-P's—is not a determiner and the relation to its right is[ or]. When step 72 determines that hierarchy-building is complete, control returns to step 58 of the picture-grouping procedure 12 where the next word is read.

Step 132 could find that the second of the 2-P's is a determiner (e.g., the third and fourth words of "bought his wife a card"). If so, step 142 inserts the symbols )[, and (. A hierarchy-building module 72-144-74 assembles the pictures preceding this inserted relation until step 144 determines that a verb has been reached; the verb acts as a picture border. When step 72 determines that hierarchy-building is complete, control returns to step 58 of the picture-grouping procedure 12 where the next word is read.

Figure 10:
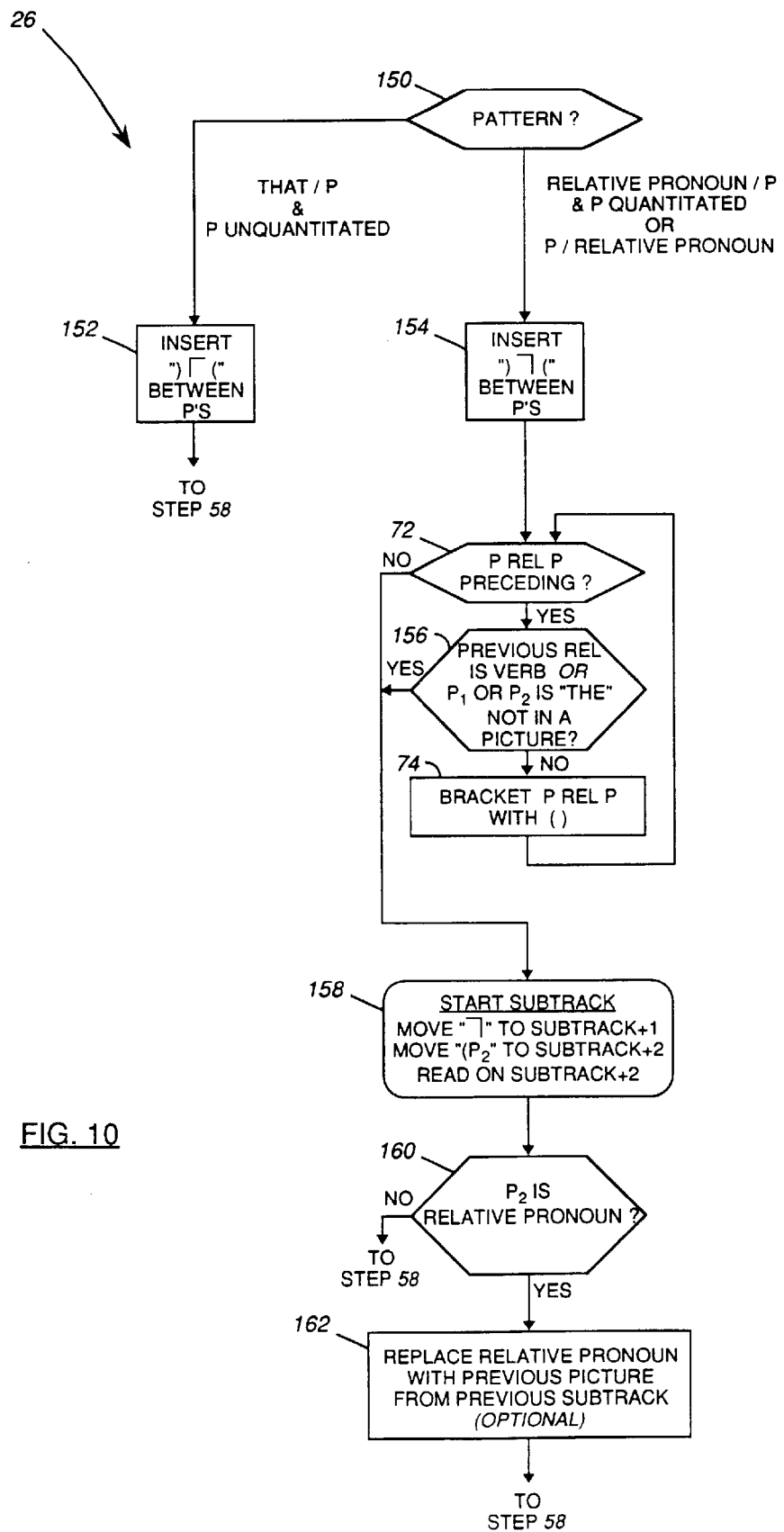
FIG. 10 shows a flowchart of the relative-pronoun processing procedure of the FIG. 2 instruction set, in which a relative pronoun initiates one of several processing pathways.

FIG. 10 shows the detailed structure of the relative-pronoun processing procedure 26. If the 2-P procedure 24 (FIG. 2) has determined that one of the two picture-words is a relative pronoun, step 150 then uses the lexicon 7 to determine the pattern fit by the two P's. If the pattern is "that"-P, with the P unquantitated (not plural), then the parser treats the relative pronoun as a demonstrative adjective. Step 152 inserts the symbols ),[, and ( into the appropriate P- and rel-boxes of the register between the two picture-words. There is no hierarchy-building and control returns directly to step 58 of the picture-grouping procedure 12 where the next word is read.

If, instead, step 150 determines that the pattern is relative pronoun/P, with P quantitated, or is P/relative pronoun then step 154 inserts the symbols),], and (. A hierarchy-building module 72-156-74 hierarchy-builds to the left of the inserted relation until step 156 determines that processing has reached either a verb or a "(the)" that is not already contained within a larger picture. Step 158 then initiates two new subtracks for processing the remainder of the sentence. In analogy to step 84 (FIG. 6), the ] is moved down to the next subtrack (current subtrack+1), in the first rel-box; then the second P and its "(" are moved to the second subtrack down (current subtrack+2), in the first P-box. The] on subtrack+1 serves to connect the previous track to subtrack+2.

It is often desirable, for later uses, to replace the relative pronoun with its referent. Therefore, before proceeding, step 160 uses the lexicon 7 to determine whether the second P is a relative pronoun. If not, control simply returns to step 58 of the picture-grouping procedure 12 where the next word is read. If so, and if the replacement option has been chosen, step 162 replaces the relative pronoun by the picture built in the register 5 just prior to beginning the subtrack. Control then returns to step 58 of the picture-grouping procedure 12 where the next word is read. For either decision made by step 160, the remaining words of the sentence are processed into subtrack+2.

Figure 11:
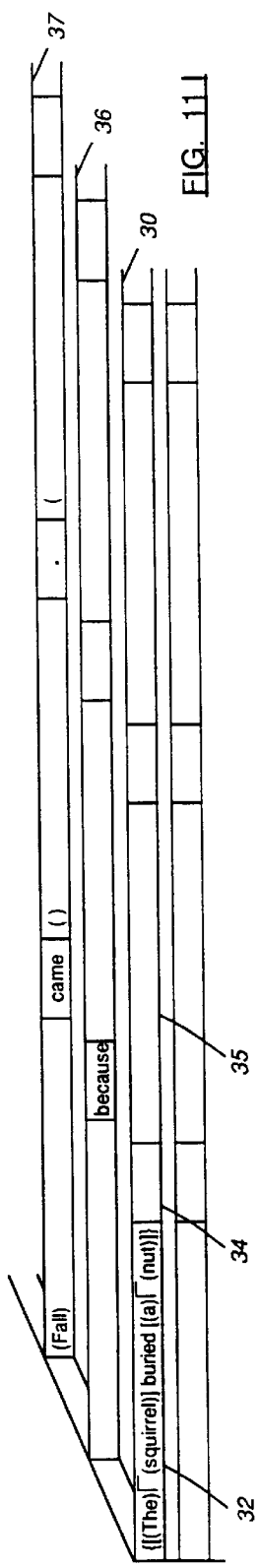
FIGS. 11A–11L show a specific example of the operation of the sidetrack shift-registers of FIG. 3 during cognitive parsing.
Figure 11:
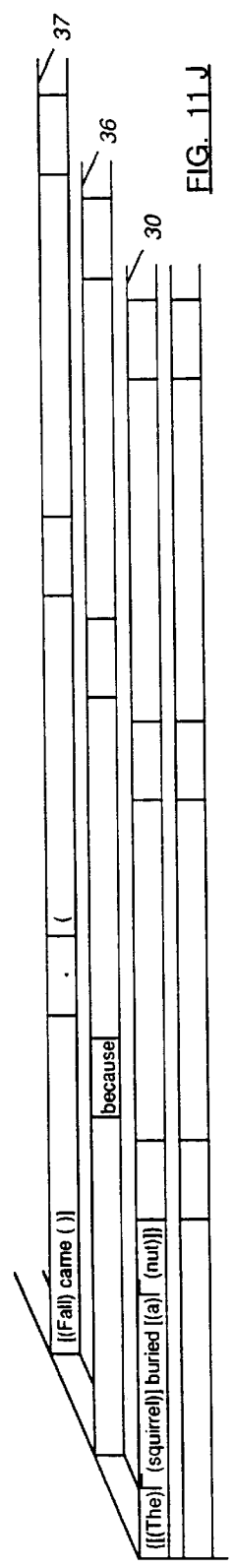
Figure 11:
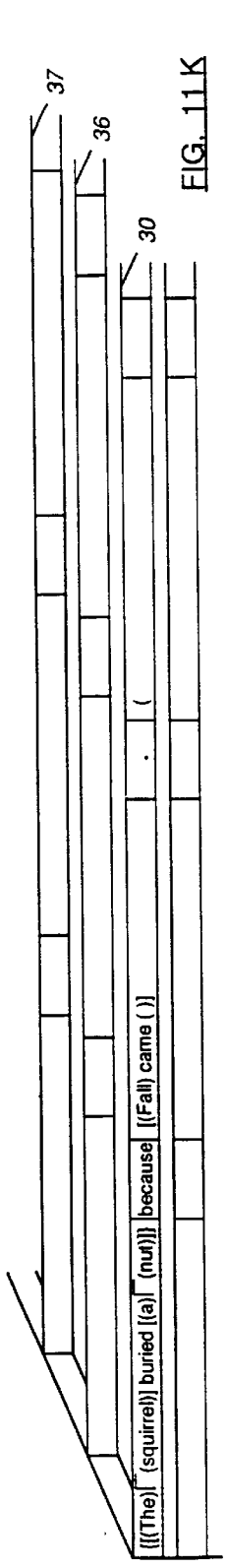
Figure 11:
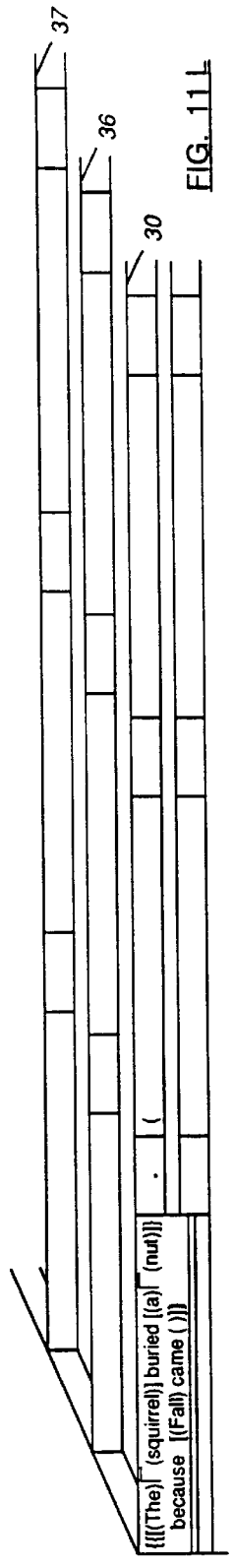
Figure 12:
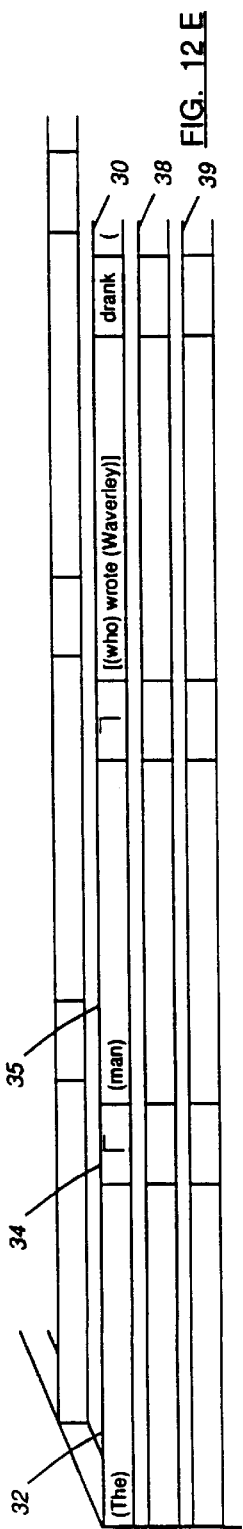
FIGS. 12A–12H show a specific example of the operation of the subtrack shift-registers of FIG. 3 during cognitive parsing.
Figure 12:
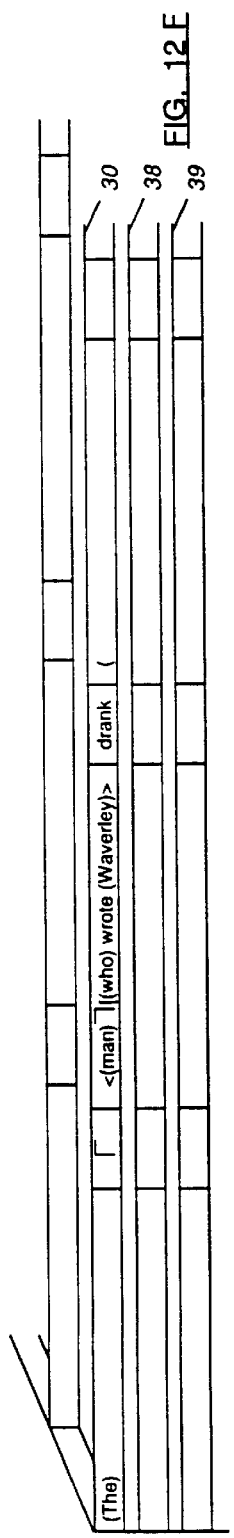
Figure 12:
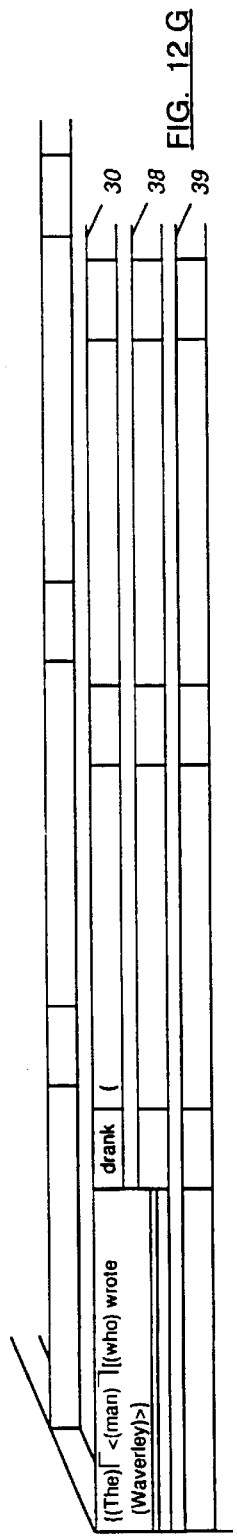
Figure 12:
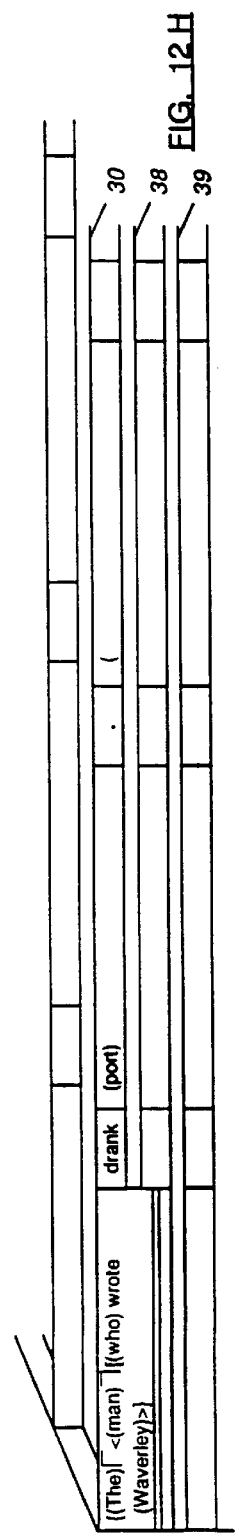

Operation of Invention: FIGS. 11–12

The cognitive parser reads a sentence, or other symbolic expression of thought, one symbol at a time. The parser's structure (FIGS. 1–10) results in a series of procedures that enact the cognitive rules (Theory of Operation). The result is a sentence or other expression that has been parsed into cognitive form, a hierarchy of (P rel P) structures. The hierarchical structure of this form is represented by the placement of markers, here parentheses. In the preferred embodiment, the procedures manipulate words within the shift-registers for words 5 (FIG. 3). The operation of the cognitive parser, and the procedures it uses, will be illustrated with two example sentences.

FIG. 11 shows the basic picture-grouping operations, and additionally shows the sidetrack procedures. The example sentence 2 is "The squirrel buried a nut because Fall came." At the outset, FIG. 11A, the first P-box 32 of the register's main track 30 is initialized with "(", which results from the relation "." ending the preceding sentence. The parser's picture-grouping stage 12 finds in the lexicon 7 that the first word, "The", represents a picture. The parser therefore places this word into the first P-box 32, after the parenthesis. The second word, "squirrel", is also found to represent a picture and so is placed into the second P-box 35. FIG. 11B shows that the parser next notes that two successive P-words have been entered, and so activates the 2-P procedure 24. Because the lexicon 7 states that "The" is more abstract than "squirrel", the 2-P procedure inserts the missing relation[ along with its outward-facing parentheses. The[ is inserted into the rel-box 34 between the two P-boxes. The ")" is inserted into the first P-box 32 after "(The", resulting in a completely-bracketed picture, "(The)". The "(" is inserted into the second P-box, resulting in "(squirrel". Note that the local contribution of one parenthesis by each relation results in long-range assembly of fully-bracketed pictures. In FIG.

11C, the parser determines that the next word, "buried", is a relation and so inserts it into the next available rel-box and also inserts the outward-facing parentheses.

Because the lexicon 7 states that "buried" is a verb, the parser next initiates the hierarchy-building procedure 14, with the result shown in FIG. 11D. "⌈" and "(squirrel)" are both shifted leftward into the first P-box 32, after (The)". "buried" is then shifted to the now-vacant first rel-box 34 and and its "(" is shifted to the now-vacant second P-box 35. Finally, an additional set of parentheses is added to the left and right ends of the first P-box 32, thereby assembling "[(The)⌈ (squirrel)]" into a picture-symbol group, a higher-level picture. In a similar way, "a" and "nut" are read and another missing⌈ is inserted as shown in FIG. 11E. The inserted relation⌈ does not hierarchy-build "The squirrel buried a" into a larger picture, because the cognitive rules state that "a" acts as a picture-border for⌈ in this situation. The relation "because" is therefore read into the third rel-box, contributing its outward-facing parentheses.

The lexicon 7 states that "because" is a higher relation—a relation that joins two statements. As a result, hierarchy-building 14 goes to completion. FIG. 11F shows that the parser shifts once to build "[(a)⌈ (nut)]" and FIG. 11G shows that it shifts again to build "{[(The)⌈ (squirrel)] buried [(a)⌈ (nut)]}".

After initiating hierarchy-building, higher relations such as "because" transfer control of the parser to the parallel-track procedure 20 (FIG. 2), in order to use sidetracks as a way of parsing separately the two separate statements in the sentence. FIG. 11H shows that the parser initiates the new sidetracks 36 & 37 by moving "because" from the first rel-box 34 of the main track 30 to the first rel-box of the first sidetrack 36. In addition, the "(" contributed by "because" is moved into the first P-box of the second sidetrack 37. FIG. 11I shows that the parser adds the next two words, "Fall" and "came", to the new sidetrack 37 and processes them in the usual way. The final period also contributes two parentheses. Because "came" is intransitive, it has no object. The result is the form "( )" in the second P-box of sidetrack 37. This form is a space for the "itself" that is the unspoken object of an intransitive verb.

The period then instructs the hierarchy-building procedure 14 to go to completion. As shown in FIG. 11J, the period first hierarchy-builds in its own sidetrack 37. FIG. 11K shows that the track-folding procedure 94 then folds the contents of the sidetracks 36 & 37 back into the vacant rel- and P-boxes 34 & 35, respectively, of the main track 30. The higher relation "because" has returned to the position 34 it occupied in FIG. 11G, but it is now followed by words already built into a picture. Finally, FIG. 11L shows that the hierarchy-building procedure 14 continues on the main track 30, with the result residing in the main track's first picture-box 32. This result is the original sentence now parsed into cognitive form, achieved by a regular and deterministic series of procedures.

FIG. 12 shows the operation of the subtrack procedures. The example sentence 2, taken from a predicate logic text, is "The man who wrote *Waverley* drank port." It is an example of what linguists consider an embedded sentence: "who wrote *Waverley*" is embedded in the larger sentence. FIG. 12A shows that the parser processes "The man" in the usual way. At "who", the parser finds in the lexicon 7 that the word is a pronoun representing a picture; the parser places "who" into the third P-box. The parser's 2-P procedure 24 (FIG. 2) begins to insert the relation missing between "man" and "who"; since the lexicon 7 states that "who" is a relative pronoun, the relative pronoun processing procedure 26 becomes active and determines that this relation is⌉. That is, the man is being defined as the one who participated in the action following "who". For this reason, the inserted⌉ must not hierarchy-build "The man" into its own picture, separate from the one to follow. The cognitive rules achieve this because, in the relative pronoun processing procedure 26, "The" is a picture-border for⌉ in this situation.

FIG. 12B shows that the relative pronoun processing procedure 26 then initiates usage of subtracks. The parser moves⌉ from its rel-box on the main track 30 into the first rel-box of the first subtrack 38; in addition, "(who" is shifted into the first P-box of the second subtrack 39. FIG. 12C shows that the parser then enters and processes the words "wrote Waverley drank" on the new subtrack 39 in the usual way.

Because a track can contain only one statement, the second verb on the subtrack 39, "drank", signals the end of that subtrack. That is, the second verb instructs the parallel-track procedure 20 to terminate the subtrack 39 and rejoin subtracks 38 & 39 to the main track 30. FIG. 12D shows that the parallel-track procedure 20 therefore first hierarchy-builds to completion on the verb's own track 39. FIG. 12E shows that the parser next folds the contents of the subtracks 38 & 39 back into the lowest vacant rel- and P-boxes of the main track 30.

Finally, FIGS. 12F & 12G show that the verb "drank" also instructs the hierarchy-building procedure to go to completion on the main track 30, using two shift-and-hierarchy-build operations. The sequence of operations driven by the second verb, "drank", is now complete. FIG. 12H shows that the parser then reads "port" and the period in the usual way. In the next step, the period would cause hierarchy-building 14 to go to completion (as in FIG. 11L).

These illustrations of the cognitive parser's operation should not be construed as indicating that the symbols used by the shift-register are limited to words, or that the symbols parsed by the cognitive parser are limited to words and sentences. Nor should these illustrations be construed as restricting the cognitive parser to devices implemented with shift-registers.

Figure 13:
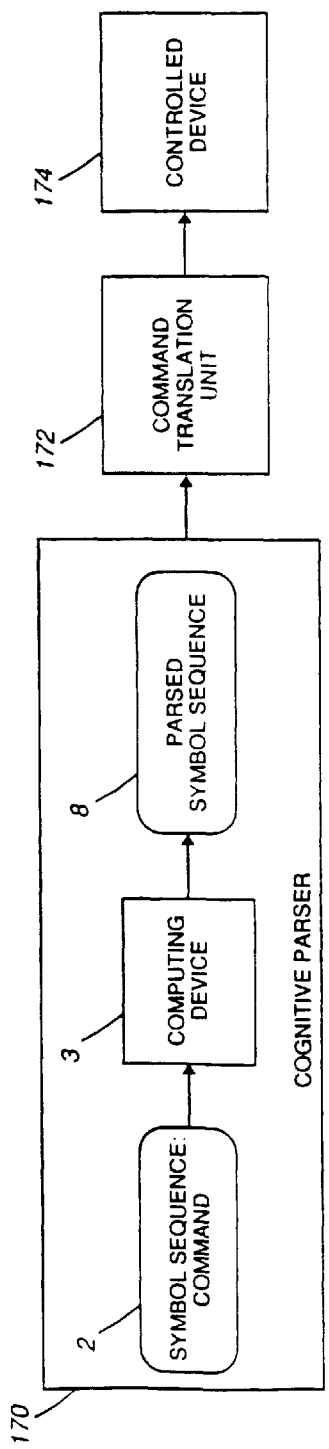
FIGS. 13A–13D show illustrative devices that incorporate a cognitive parser such as the one shown in FIG. 1.
Figure 13:
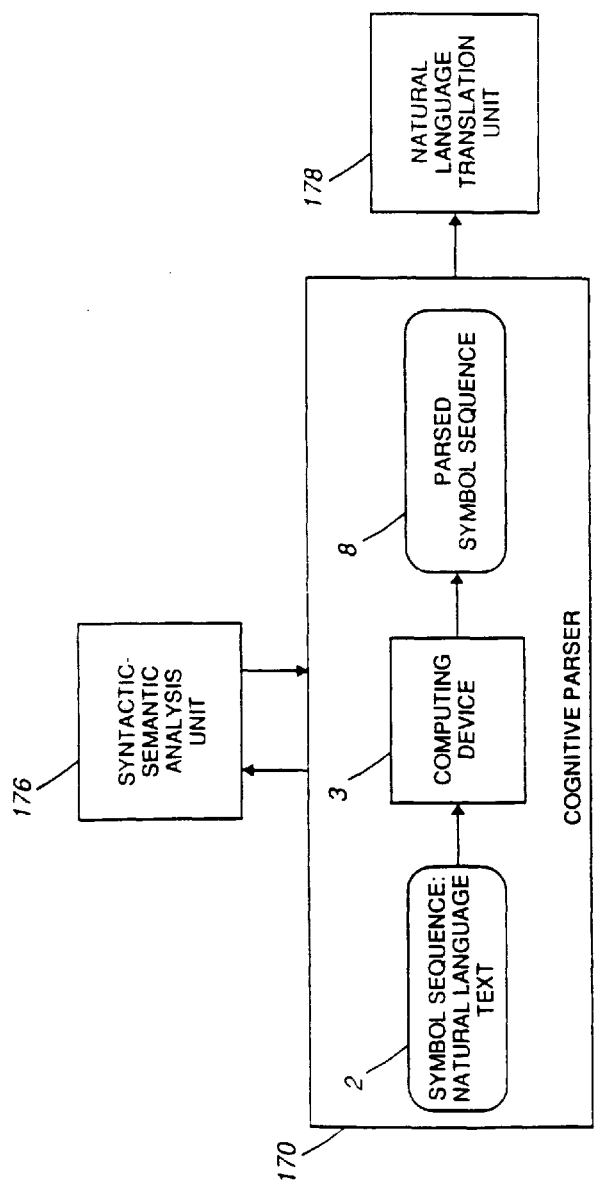

Devices Incorporating Invention: FIG. 13

As described in the Background, a cognitive parser can be incorporated as a key component of another device, simplifying and speeding its operation compared to devices using syntactic or semantic parsers alone. Four illustrative classes of device are shown in FIG. 13. FIG. 13A shows the structure of command-operated devices, which use cognitively-parsed natural language to generate the specific commands native to the device. These commands drive simple devices, such as kitchen appliances, lighting, heating or air conditioning, and videocassette recorders, or more complex devices such as computers. A command in natural language 2 is the input to a cognitive parser 170 of the type described in FIGS. 1–12. The parsed symbol sequence 8 outputted from the cognitive parser is the input to a command-translation unit 172 containing a small lexicon listing equivalent phrasings for each of the limited number of native commands used by the device. For a given natural language command, the command-translation unit 172 outputs a command native to the controlled device 174.

FIG. 13B shows the structure of a natural language translation device, for which the input symbol sequence 2 is a natural language text. The cognitive parser 170 produces a parsed symbol sequence 8, using a syntactic and semantic analyzer unit 176 to resolve words that can be either a picture or a relation, rather than using syntactic and semantic analysis to decide among grammar rules. The parsed symbol sequence 8 is then the input into a natural language translation unit 178, which translates the expression in the first language to an equivalent expression in a second language and displays the result.

FIG. 13C shows the structure of a knowledge-storage device that stores facts in cognitive form. Beginning with a natural language text representing facts 2, the cognitive parser 170 produces a parsed symbol sequence in cognitive form 8, again using a syntactic and semantic analyzer unit 176 to resolve entity-type ambiguities. The parsed symbol sequence is the input to a storage unit 180, which thus stores in cognitive form the facts in the input text 2.

FIG. 13D shows the structure of a logical inference device that uses a cognitive parser. As in FIG. 13C, the input is a natural language text representing facts 2, which the cognitive parser 170 and syntactic-semantic analyzer unit 176 convert to a parsed symbol sequence in cognitive form 8. This symbol sequence is the input to a semantic representation unit 182, including a lexicon that lists the semantic primitives and logical operations equivalent to potential input symbol sequences. Various equivalent natural language inputs 2 thus lead to the same semantic representation output. This semantic representation is the input to a logical inference engine 184, which performs logical deductions from stored and newly-presented facts.

Conclusion, Ramifications, and Scope of Invention

The cognitive parser provides a simple means of parsing natural language and other symbolic expressions of thought using a small number of stored rules, minimal stored semantic information, and minimal requirement for disambiguation, and is capable of parsing while the symbolic expression is being entered into the device. Its operation is not limited to a specific knowledge base or to anticipatable thoughts. The cognitive parser's simplicity allows it to be used in personal computers and in non-computer devices equipped with only minimal computing power.

The parsed natural language structure produced would make it easier for untrained users to use a computer for storing information, querying a database, or finding logical inferences. By replacing multiple layers of menus, it would make computers easier to use even for trained users and allow control of kitchen appliances, videocassette recorders, home lighting, and heating and air conditioning. Another use for the parsing operations would be as a programming language that resembled natural language. Because cognitive form reflects the structure of the thoughts underlying language more accurately than does traditional grammar, the cognitive parser would be useful in teaching grammar. Because those sentences which can be parsed using cognitive rules without semantic analysis are easiest to understand, the cognitive parser could be used as a reading-level checker. In combination with a device performing semantic interpretation, lexical-functional grammar, or preference semantics, the cognitive parser could parse non-grammatical or idiomatic sentences. Combination with a device performing semantic interpretation or conceptual dependency analysis could constitute an input to a device performing logical inference involving the properties of objects.

Although the description above contains many specificities, these should not be construed as limiting the scope of the invention but as merely illustrating capabilities of the presently preferred embodiment of the cognitive parser. It will be understood by those having skill in the art that changes can be made to the specific embodiment without departing from the spirit or scope of the invention.

For example, input and output could use voice-recognition or speech-production devices, electronic scanning or transfer of text, graphical display of the hierarchy of symbol groups, or a printer. Processing could begin during sentence entry or after a period. The lexicon entries could be arranged by individual words or word roots. An ordinary dictionary-like lexicon could be used by modifying the cognitive parsing rules to treat nouns, pronouns, and adjectives as pictures and to treat verbs and prepositions as relations. The parsing operations and registers could be implemented in hardware rather than software, by direct manipulation of memory addresses and pointers rather than by manipulating words or parentheses, or in any instruction format acceptable to the computing element instead of in a high-level programming language. The parsing operations could be implemented as immediate-constituent production rules rather than as procedures.

Markers for the borders of symbol groups could be overlines, nested boxes, or other symbols different from parentheses. The parser could place grouping-markers by calculating marker positions rather than by manipulating words, or symbol group borders could be embodied by discontinuities in computing element addresses rather than by markers. Word manipulation could be performed by manipulating computing element addresses for words rather than manipulating the words themselves. Symbols parsed could be icons or American sign language configurations rather than words. Languages with sentence patterns different from those of English could be parsed by grouping symbols into (P P rel) or (rel P P) symbol groups. The device could also be operated in reverse for sentence production, using as input a symbol sequence divided into symbol-groups and having one word designated as the sentence's subject.

Accordingly, the scope of the invention should be determined by the appended claims and their legal equivalents, rather than by the embodiments illustrated.

What is claimed is:

1. An apparatus for parsing symbol sequences such as natural language sentences into an organized symbol hierarchy, comprising:

a microprocessor;

a memory addressable by said microprocessor;

a lexicon, stored in said memory, including symbols and an entity-type corresponding to each symbol, the entity-type selected from the group consisting of a picture-like entity, a relation, and a picture-like entity accompanied by a relation;

an input device for inputting the symbol sequence to said microprocessor;

a procedure, executing on said microprocessor, for determining the entity-type corresponding to each inputted symbol by searching said lexicon, and for grouping the inputted symbols according to rules based on entity-type; and an output device for outputting the symbol grouping.

2. The apparatus of claim 1, wherein said input device comprises a keyboard.

3. The apparatus of claim 1, wherein said input device comprises a voice-recognition system.

4. The apparatus of claim 1, wherein said output device comprises a display screen.

5. The apparatus of claim 1, wherein said output device comprises a software program for using the symbol grouping.

6. The apparatus of claim 5, wherein said software program operates a control unit of another device.

7. The apparatus of claim 1, wherein said output device comprises an information storage device.

8. The apparatus of claim 1, wherein said lexicon includes a cognitive category valuation for each symbol that designates a picture-like entity, the cognitive category substantially ranging from sensation-related to abstract concepts; and wherein said program includes a consecutive picture-symbol routine that uses the cognitive category valuation for inserting a relation-designating symbol between consecutive symbols which designate picture-like entities.

9. The apparatus of claim 1, wherein said procedure includes routines selected from the group consisting of a picture-symbol grouping routine, a hierarchy-building routine, and a track-utilization routine; and wherein said procedure uses said routines for building a symbol group consisting of picture-designating symbols and relation-designating symbols.

10. The apparatus of claim 1, wherein said lexicon includes symbol-grouping properties corresponding to at least some of the symbols; and wherein said procedure also determines the symbol-grouping properties corresponding to an inputted symbol and also groups the inputted picture-designating and relation-designating symbols into a symbol group according to the symbol-grouping properties.

11. A lexicon for use in a parser for symbol sequences such as natural language sentences comprising:

a memory device; and a table, stored in said memory device, including a plurality of symbols and an entity-type corresponding to each symbol of the plurality of symbols, the entity-type selected from the group consisting of a picture-like entity, a relation, and a picture-like entity accompanied by a relation.

12. The lexicon of claim 11, wherein said table further comprises a cognitive category valuation for each symbol of the plurality of symbols which designates a picture-like entity, the cognitive category valuation substantially ranging from sensation-related to abstract concepts.

13. The lexicon of claim 11, wherein said table further comprises symbol-grouping properties associated with at least one of the plurality of symbols, said symbol-grouping properties applying to picture-designating and relation-designating symbols of said symbol sequences.

14. An apparatus operated by symbol sequences such as natural language sentences, comprising:

a microprocessor;

a memory addressable by said microprocessor;

a lexicon, stored in said memory, including symbols and an entity-type corresponding to each symbol, the entity-type selected from the group consisting of a picture-like entity, a relation, and a picture-like entity accompanied by a relation;

an input device for inputting the symbol sequence to said microprocessor; and a program, executing on said microprocessor, for determining the entity-type corresponding to each inputted symbol by searching said lexicon, for grouping the inputted symbols according to rules based on entity-type, and for generating an instruction for operating the apparatus in response to the symbol grouping.

15. The apparatus of claim 14, wherein said input device comprises a keyboard.

16. The apparatus of claim 14, wherein said input device comprises a voice-recognition system.

17. A method for parsing symbol sequences such as natural language sentences into an organized symbol hierarchy, comprising the steps of:

receiving a symbol sequence;

extracting a symbol from the received symbol sequence;

searching a lexicon with the extracted symbol and retrieving an entity-type corresponding to the symbol, the entity-type selected from the group consisting of a picture-like entity, a relation, and a picture-like entity accompanied by a relation;

grouping the symbols according to the retrieved entity-types;

repeating the extracting, searching, retrieving, and grouping steps for each symbol in the received symbol sequence; and outputting said symbol grouping.

18. The method of claim 17, wherein the retrieving step comprises retrieving a cognitive category valuation for each symbol that designates a picture-like entity; and wherein the method includes the step of inserting a relation-designating symbol between consecutive symbols in the received symbol sequence which designate picture-like entities.

19. The method of claim 17, wherein said grouping step includes building a symbol group consisting of picture-designating symbols and relation-designating symbols.

20. The method of claim 17, wherein said searching step further comprises retrieving symbol-grouping properties corresponding to the symbol; and wherein said grouping step comprises grouping the inputted picture-designating and relation-designating symbols according to the retrieved entity-types and symbol-grouping properties.

* * * * *

UNITED STATES PATENT AND TRADEMARK OFFICE
CERTIFICATE OF CORRECTION

PATENT NO. : 5,960,384                                  Page 1 of 2
DATED     : September 28, 1999
INVENTOR(S) : Douglas E. Brash It is certified that error appears in the above-identified patent and that said Letters Patent is hereby corrected as shown below:

Col. 14, line 43, change "(The) ⌈ (man) ⌉" to
--(The) ⌈ (man)
  ⌉--.
  Note that the correction occupies two lines.

Col. 14, line 46, change "(The) ⌈ (man) ⌉" to
--(The) ⌈ (man)
  ⌉--.
  The correction occupies two lines.

Col. 15, line 6, change "(He) drove (the) ⌈ (bus) ⌉" to
--(He) drove (the) ⌈ (bus)
  ⌉--.
  The correction occupies two lines.

Col. 15, line 7, change "(that) ⌉" to
--(that)
  ⌉--.
  The correction occupies two lines.

Col. 15, line 12, change "(He) drove (the) ⌈ (bus) ⌉" to
--(He) drove (the) ⌈ (bus)
  ⌉--.
  The correction occupies two lines.

UNITED STATES PATENT AND TRADEMARK OFFICE
CERTIFICATE OF CORRECTION

PATENT NO. : 5,960,384
DATED : September 28, 1999
INVENTOR(S) : Douglas E. Brash It is certified that error appears in the above-identified patent and that said Letters Patent is hereby corrected as shown below:

Col. 23, line 32, change "symbols), ], and (between" to
-- symbols ), ], and ( between --.
    I.e., each parenthesis is separated from the adjacent word by a space.

Col. 23, line 44, change "symbols)," to -- symbols ), --.
    I.e., parenthesis is separated from the adjacent word by a space.

Col. 23, line 54, change "symbols )[" to -- symbols ), [ --.

Col. 24, line 9, change "symbols)," to -- symbols ), --.
    I.e., parenthesis is separated from the adjacent word by a space.

Signed and Sealed this

Twenty-seventh Day of June, 2000

*Attest:*

Q. TODD DICKINSON

*Attesting Officer*      *Director of Patents and Trademarks*